United States Patent
Furukawa et al.

(10) Patent No.: US 9,344,019 B2
(45) Date of Patent: May 17, 2016

(54) CONTROL DEVICE AND METHOD FOR AC ROTATING MACHINE, AND ELECTRICAL POWER STEERING DEVICE

(75) Inventors: Akira Furukawa, Chiyoda-ku (JP); Yoshihiko Kimpara, Chiyoda-ku (JP); Jiro Okada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 14/370,087

(22) PCT Filed: May 11, 2012

(86) PCT No.: PCT/JP2012/062177
§ 371 (c)(1),
(2), (4) Date: Jul. 1, 2014

(87) PCT Pub. No.: WO2013/125057
PCT Pub. Date: Aug. 29, 2013

(65) Prior Publication Data
US 2014/0368150 A1 Dec. 18, 2014

(30) Foreign Application Priority Data
Feb. 24, 2012 (JP) ................................. 2012-038898

(51) Int. Cl.
*H02P 3/22* (2006.01)
*H02P 6/12* (2006.01)
(Continued)

(52) U.S. Cl.
CPC ................ *H02P 6/12* (2013.01); *B62D 5/0403* (2013.01); *B62D 5/046* (2013.01); *B62D 5/0484* (2013.01); *B62D 5/0487* (2013.01); *H02P 6/14* (2013.01); *H02P 25/22* (2013.01); *H02P 29/022* (2013.01)

(58) Field of Classification Search
CPC ............. H02P 7/08; H02P 27/08; H02H 7/08; H02H 7/122
USPC .......... 318/400.01, 400.02, 400.14, 700, 701, 318/727, 779, 799, 800, 801, 432, 528, 318/400.26, 400.27, 400.28, 400.29, 299, 318/515, 516; 361/63, 65, 88; 363/40, 55, 363/56.03, 56.04, 95, 98, 109, 174, 175
See application file for complete search history.

(56) References Cited

U.S. PATENT DOCUMENTS 8,040,096 B2 * 10/2011 Taniguchi ............... H02M 1/32
 318/490
8,248,010 B2 * 8/2012 Mukai et al. ............. 318/400.21
(Continued)

FOREIGN PATENT DOCUMENTS

EP 2808999 A1 12/2014
JP 2005-312234 A 11/2005
(Continued)

OTHER PUBLICATIONS

International Search Report of PCT/JP2012/062177 dated Jul. 31, 2012.
(Continued)

*Primary Examiner* — Antony M Paul
(74) *Attorney, Agent, or Firm* — Sughrue Mion, PLLC; Richard Turner

(57) ABSTRACT

Provided is a control device for an AC rotating machine, for controlling the AC rotating machine including a plurality of sets of windings. The control device includes: a plurality of inverters each including, in respective phases, switching elements for controlling voltages to be applied to respective phases of the windings; current control portion for issuing voltage commands corresponding to the voltages to the respective inverters to control currents flowing through the windings; and failure detection portion for detecting at least one of a short-circuit failure or an open-circuit failure in each of the switching elements. The current control portion sets, in accordance with the failure detected by the failure detection portion, the same potential side of the respective phases of a faulty-side inverter in the same state as in the detected failure, and continues control on a normal-side inverter except for the faulty-side inverter.

22 Claims, 18 Drawing Sheets

(51) Int. Cl.
*B62D 5/04* (2006.01)
*H02P 6/14* (2016.01)
*H02P 25/22* (2006.01)
*H02P 29/02* (2016.01)

(56) References Cited

U.S. PATENT DOCUMENTS

2010/0060222 A1 3/2010 Kezobo et al.
2010/0263953 A1 10/2010 Shimana
2011/0043152 A1* 2/2011 Kidokoro et al. ............. 318/490
2011/0074333 A1 3/2011 Suzuki
2011/0156626 A1* 6/2011 Mukai et al. ............. 318/400.21

FOREIGN PATENT DOCUMENTS

| | | |
|---|---|---|
| JP | 2009-195026 A | 8/2009 |
| JP | 2011-045212 A | 3/2011 |
| JP | 2011-078230 A | 4/2011 |
| WO | 2008/129658 A1 | 10/2008 |

OTHER PUBLICATIONS

Communication dated Dec. 22, 2015 from the European Patent Office issued in corresponding application No. 12869210.0.

* cited by examiner

CONTROL DEVICE AND METHOD FOR AC ROTATING MACHINE, AND ELECTRICAL POWER STEERING DEVICE

CROSS REFERENCE TO RELATED APPLICATIONS

This is a National Stage of International Application No. PCT/JP2012/062177 filed May 11, 2012, claiming priority based on Japanese Patent Application No. 2012-038898 filed Feb. 24, 2012, the contents of all of which are incorporated herein by reference in their entirety.

TECHNICAL FIELD

The present invention relates to control performed in case of a short-circuit failure and an open-circuit failure in an AC rotating machine (AC rotary electrical machine).

BACKGROUND ART

In the case where a control device for an AC rotating machine is used for, for example, electrical power steering, even when a failure occurs in a specific portion, the AC rotating machine is desired to be continuously driven while avoiding the failure.

For example, a related-art control device for an AC rotating machine described in Patent Literature 1 includes current control portion for determining phase voltage commands in accordance with a torque current command and currents respectively flowing in phases of an electric motor, a switching element driving circuit for instructing an inverter to perform a switching operation based on the respective phase voltage commands, the inverter for driving the electric motor in response to a switching operation signal, current detectors arranged in series with respect to switching elements of the respective phases of the inverter, and short-circuit portion specifying portion for storing a test pattern indicating a predetermined combination for turning ON the switching elements of the inverter and for specifying a portion at which a short-circuit failure occurs, based on the test pattern and current detection values of the respective phases, which are detected by the current detectors as responses to the test pattern. As a result, the portion at which the short-circuit failure occurs can be quickly and precisely specified.

By providing two sets of windings to the AC rotating machine, the AC rotating machine can be continuously driven while avoiding a failure. For example, a related-art control device for an AC rotating machine described in Patent Literature 2 has a configuration in which, two sets of windings and two sets of inverters for controlling currents flowing through the two sets of windings are provided to the AC rotating machine so that the currents can be individually controlled. In case of a failure in one of the windings or one of the inverters, all the switching elements of a failure system are turned OFF to reduce or cancel a brake torque. Moreover, it is also described that the drive is continued for the non-faulty phases of the failure system so as to reduce or cancel the brake torque in a non-faulty system.

CITATION LIST

Patent Literature

[PTL 1] WO 2008/129658 A1
[PTL 2] JP 2011-78230 A

SUMMARY OF INVENTION

Technical Problem

For example, for the control device for an AC rotating machine described in Patent Literature 1, however, only one set of the windings is provided in the AC rotating machine. Therefore, even if the portion at which the short-circuit failure occurs is specified, it is not easy to operate the current in the portion at which the short-circuit failure occurs at a desired value. Therefore, there is a problem in that smooth rotation cannot be maintained due to the generation of the brake torque or the like.

In the example of Patent Literature 2, when the short-circuit failure occurs, a torque acting in a direction in which the rotation of the motor is decelerated, that is, the brake torque is generated. The brake torque changes in accordance with the phases of the motor, which leads to a fluctuation of an output torque to give feeling of discomfort to a user. In Patent Literature 2, all the switching elements are turned OFF in case of the open-circuit (OFF) failure so as to reduce the torque fluctuation. In case of the short-circuit (ON) failure, however, all the switching elements cannot be turned OFF. Moreover, it is proposed that the drive for the non-faulty phase is continued so that the effects of the brake torque generated from the faulty phase are reduced or cancelled on the non-faulty system. However, the control is performed even for the non-faulty phase, and hence becomes complex. Further, the control is performed based on a detected rotation angle. Therefore, when accuracy of the rotation angle is low, there is a fear in that the brake torque is conversely generated instantaneously to lead to user's feeling of discomfort.

The present invention has been made to solve the problems described above, and therefore has an object to provide a control device for an AC rotating machine which can set a constant brake torque regardless of a rotation angle to minimize a torque pulsation without complex control in case of a short-circuit failure or an open-circuit failure, and the like.

Solution to Problem

According to one embodiment of the present invention, there is provided a control device for an AC rotating machine, for controlling the AC rotating machine including a plurality of sets of windings. The control device includes: a plurality of inverters each including, in respective phases, switching elements for controlling voltages to be applied to respective phases of the plurality of sets of windings; current control portion for issuing voltage commands corresponding to the voltages to the respective plurality of inverters to control currents flowing through the plurality of sets of windings; and failure detection portion for detecting at least one of a short-circuit failure or an open-circuit failure in each of the switching elements. The current control portion sets, in accordance with the at least one of the short-circuit failure or the open-circuit failure detected by the failure detection portion, the same potential side of the respective phases of a faulty-side inverter in the same state as in the detected failure, and continues control on a normal-side inverter except for the faulty-side inverter.

Advantageous Effects of Invention

According to one embodiment of the present invention, in case of the short-circuit failure or the open-circuit failure, the brake torque can be set constant regardless of the rotation angle to minimize the torque pulsation without complex control.

DESCRIPTION OF EMBODIMENTS

Figure 1:
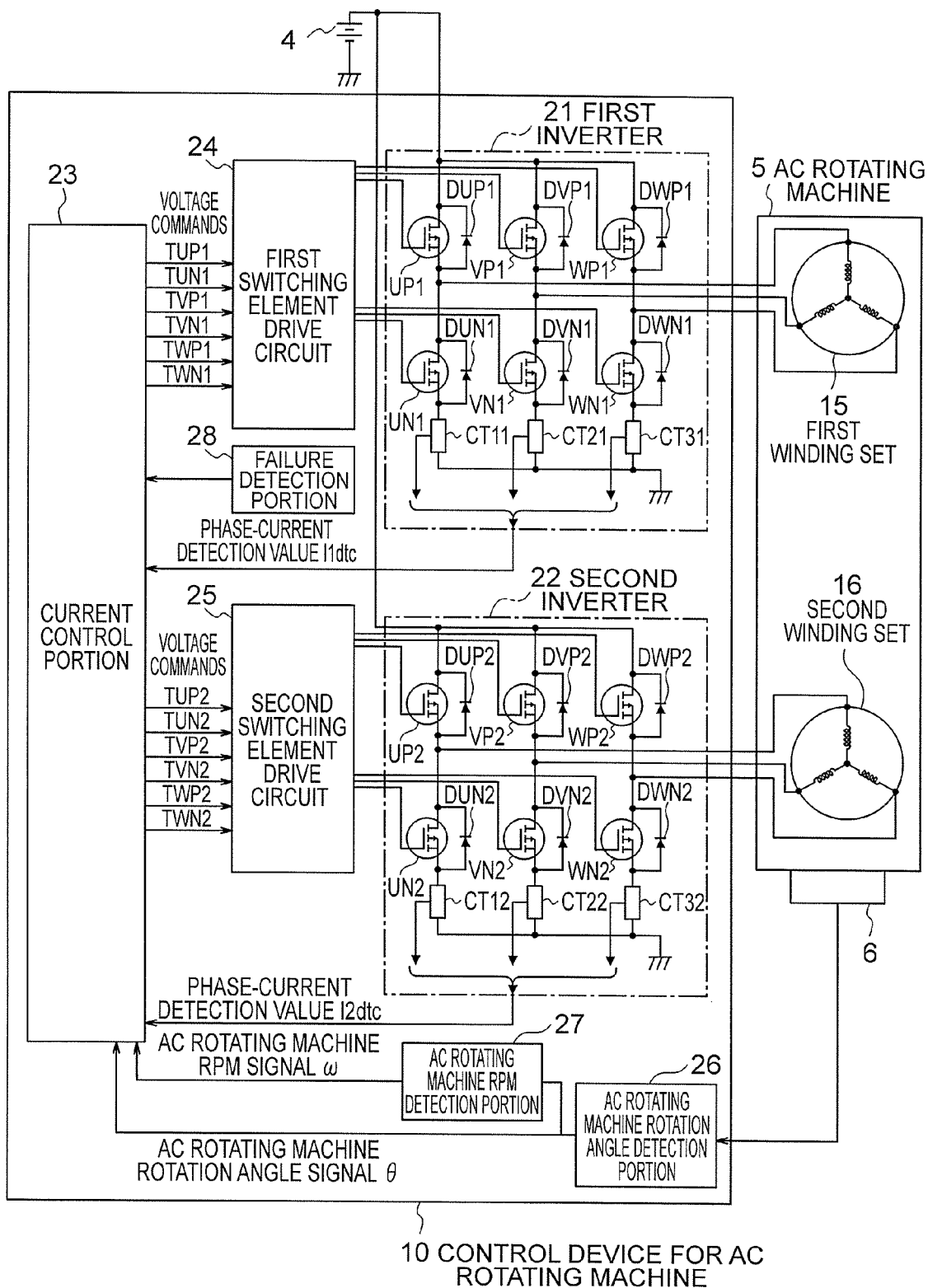
FIG. 1 is a schematic block diagram illustrating an example of an overall configuration common to embodiments of a control device for an AC rotating machine according to the present invention.

Now, a control device for an AC rotating machine and an electrical power steering device including the control device for an AC rotating machine according to the present invention are described in accordance with embodiments of the present invention referring to the drawings. In each of the embodiments, the same or corresponding parts are denoted by the same reference symbols, and the overlapping description thereof is herein omitted.

First Embodiment

FIG. 1 is a schematic block diagram illustrating an example of an overall configuration common to the embodiments of the control device for an AC rotating machine according to the present invention. Besides a control device 10 for an AC rotating machine, a power supply 4, an AC rotating machine 5, and an AC rotating machine rotation angle sensor 6 for detecting a rotation angle of the AC rotating machine 5 are also illustrated.

The AC rotating machine 5 includes a first winding set 15 having three phases, that is, phases U1, V1, and W1, and a second winding set 16 including three phases, that is, phases U2, V2, and W2. In each of the winding sets, the phases are connected in a star connection configuration. A stator (not shown) is configured with the plurality of winding sets. The AC rotating machine 5 includes the stator, a rotor (not shown), and a rotary shaft fixed to the rotor. In the description below, the case where the present invention is applied to a permanent magnet type synchronous AC rotating machine in which each of the winding sets has three phases and permanent magnets are arranged in the rotor is described as an example. However, the present invention can be used for an AC rotating machine which is rotationally driven by a polyphase AC having three or more phases, and may be used for an induction machine or a field winding type synchronous machine. Although the windings are formed by the star connection in this example, the same effects can be obtained by delta connection.

The control device 10 for an AC rotating machine instructs current control portion 23 to issue voltage commands to a first inverter 21 and a second inverter 22. The current control portion 23 commands voltages TUP1, TUN1, TVP1, TVN1, TWP1, and TWN1 to be applied to the first winding set 15 to control currents of the respective phases U1, V1, and W1 of the first winding set 15 and commands voltages TUP2, TUN2, TVP2, TVN2, TWP2, and TWN2 to be applied to the second winding set 16 to control currents of the respective phases U2, V2, and W2 of the second winding set 16.

The voltages commands are issued for the respective phases. Therefore, TUP1 denotes a command to UP1, TUN1 denotes a command to UN1, TVP1 denotes a command to VP1, TVN1 denotes a command to VN1, TWP1 denotes a command to WP1, and TWN1 denotes a command to WN1. Moreover, TUP2 denotes a command to UP2, TUN2 denotes a command to UN2, TVP2 denotes a command to VP2, TVN2 denotes a command to VN2, TWP2 denotes a command to WP2, and TWN2 denotes a command to WN2. The reference symbols UP1, UN1, VP1, VN1, WP1, WN1, UP2, UN2, VP2, VN2, WP2, and WN2 denote switching elements.

A first switching element drive circuit 24 receiving the voltage commands TUP1, TUN1, TVP1, TVN1, TWP1, and TWN1 drives the UP1 and UN1 of the phase U1, the VP1 and VN1 of the phase V1, and the WP1 and WN1 of the phase W1 of the first inverter 21 in accordance with the commands. A second switching element drive circuit 25 receiving the voltage commands TUP2, TUN2, TVP2, TVN2, TWP2, and TWN2 drives the UP2 and UN2 of the phase U2, the VP2 and VN2 of the phase V2, and the WP2 and WN2 of the phase W2 of the second inverter 22 in accordance with the commands. For example, when the UP1 is switched ON, the UN1 is switched OFF, the VP1 is switched OFF, and the VN1 is switched ON, the current supplied from the power supply 4 flows in the order of the UP1, the first winding set 15, and the VN1.

The control device 10 for an AC rotating machine receives a signal from the AC rotating machine rotation angle sensor 6. Then, an AC rotating machine rotation angle signal θ is calculated by AC rotating machine rotation angle detection portion 26. AC rotating machine rpm detection portion 27 performs time-differentiation on the rotation angle signal θ to calculate an AC rotating machine rpm signal ω. Although the AC rotating machine rotation angle sensor 6 and the AC rotating machine rotation angle detection portion 26 are provided, the AC rotary machine rotation angle signal θ and the AC rotary machine rpm signal ω may be obtained based on an AC rotating machine rotation angle estimated by a known technology.

The control device 10 for an AC rotating machine includes failure detection portion 28 for detecting a portion at which a failure occurs. The failure detection portion 28 stores a test pattern indicating a predetermined combination for switching ON the switching elements for each of the first inverter 21 and the second inverter 22 in a memory (not shown) by, for example, the same method as described in Patent Literature 1, and specifies a portion at which a short-circuit failure occurs and a portion at which an open-circuit failure occurs described below based on the test pattern and the current values of the respective phases detected by a current detection circuit described below as a response to the test pattern. In the case of the control device for an AC rotating machine described in Patent Literature 1, the AC rotating machine includes only one set of windings. Therefore, even if the portion at which the short-circuit failure occurs is specified, it is not easy to operate the current in the portion at which the short-circuit failure occurs to a desired value. Therefore, there is a problem in that smooth rotation cannot be maintained due to the generation of a brake torque or the like. In this embodiment, the plurality of windings are provided. Therefore, if the failure occurs in one of the winding systems, a fluctuation of the brake torque generated on a faulty side can be reduced, whereas a normal-side winding system is controlled. In this manner, the AC rotating machine can be smoothly rotated.

In the control device 10 for an AC rotating machine, phase currents flowing in the respective phases of the AC rotating machine are detected by current detection circuits CT11, CT21, CT31, CT12, CT22, and CT32 to obtain phase-current detection values I1dtc and I2dtc. Here, I1dtc denotes a current vector having U1, V1, and W1 components, and I2dtc denotes a current vector having U2, V2, and W2 components. In this embodiment, six current detection circuits in total are provided for the respective phases so as to detect the currents of the respective phases. However, a configuration in which a total number of the provided current detection circuits is two may be used instead so that each one of the current detection circuits is provided between the power supply and each of the inverters. Alternatively, a configuration in which a total number of the provided current detection circuits is four may be used instead so that two of the current detection circuits are provided between the power supply and each of the inverters. Even with the configurations described above, the currents of the respective phases can be detected by performing detection in accordance with timing of driving the switching elements ON or OFF.

An operation of this embodiment is described below taking the case, as an example, where the short-circuit failure occurs on a high-potential side of the phase W1 of the first winding drive system. Here, it is assumed that the first winding set 15 and the second winding set 16 generate the same output torque when the first inverter 21 and the second inverter 22 both operate normally.

Figure 2:
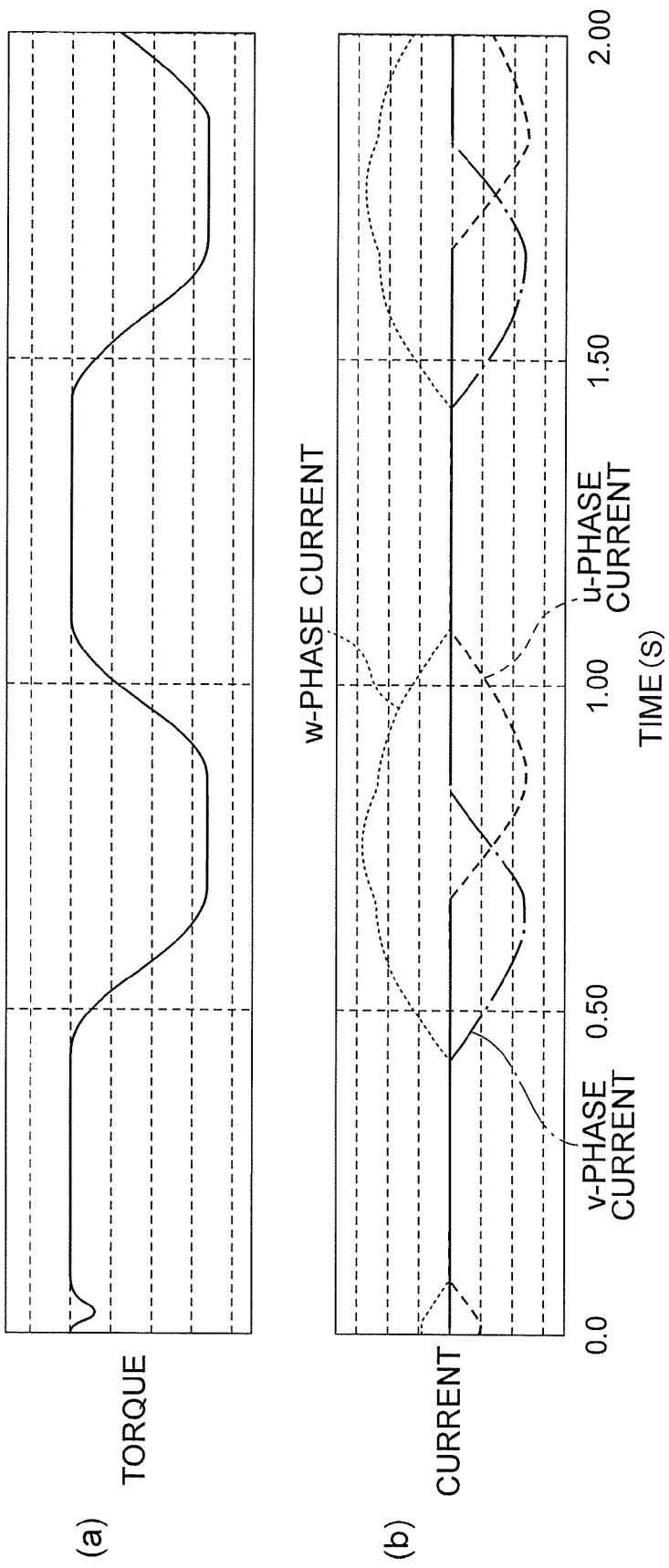
FIG. 2 are graphs showing the relationship between elapse of time, and a torque and currents of respective phases when a short-circuit failure occurs on a high-potential side of a phase W1 of a first winding drive system.

At this time, a state of the switching element WP1 included in the first inverter 21 becomes constantly ON. When the AC rotating machine 5 rotates in the case where the switching elements except for WP1, that is, UP1, UN1, VP1, VN1, and WN1 are in an OFF state, an induced voltage is generated in the first winding set 15. As a result, currents as shown in FIG. 2(b) flow in the first winding set 15. FIGS. 2(a) and 2(b) are graphs showing the relationship between elapse of time, and the torque and the currents when the short-circuit failure occurs on the high-potential side of the phase W1 of the first winding drive system. A u-phase current shown in FIG. 2(b) is the current flowing in the phase U1, a v-phase current is the current flowing in the phase V1, and a w-phase current is the current flowing in the phase W1. The flows of the currents are varied as compared with those in the normal state. Therefore, as shown in FIG. 2(a), a rotation angle region in which the brake torque is generated is generated. During one cycle from 0.45 seconds to 1.45 seconds in time, there are the rotation angle region (from 0.45 seconds to 1.1 seconds in time) in which the brake torque is generated and a rotation angle region with the torque 0 (from 1.1 seconds to 1.45 seconds in time). Therefore, a torque pulsation is generated to give feeling of discomfort to a user. With the control for reducing and cancelling the brake torque in accordance with the rotation angle as described in Patent Literature 2, the torque pulsation can be perfectly cancelled if there is no error in the rotation angle. When the rotation angle has a low accuracy, however, the brake torque is instantaneously generated, leading to the feeling of discomfort to the user.

Figure 3:
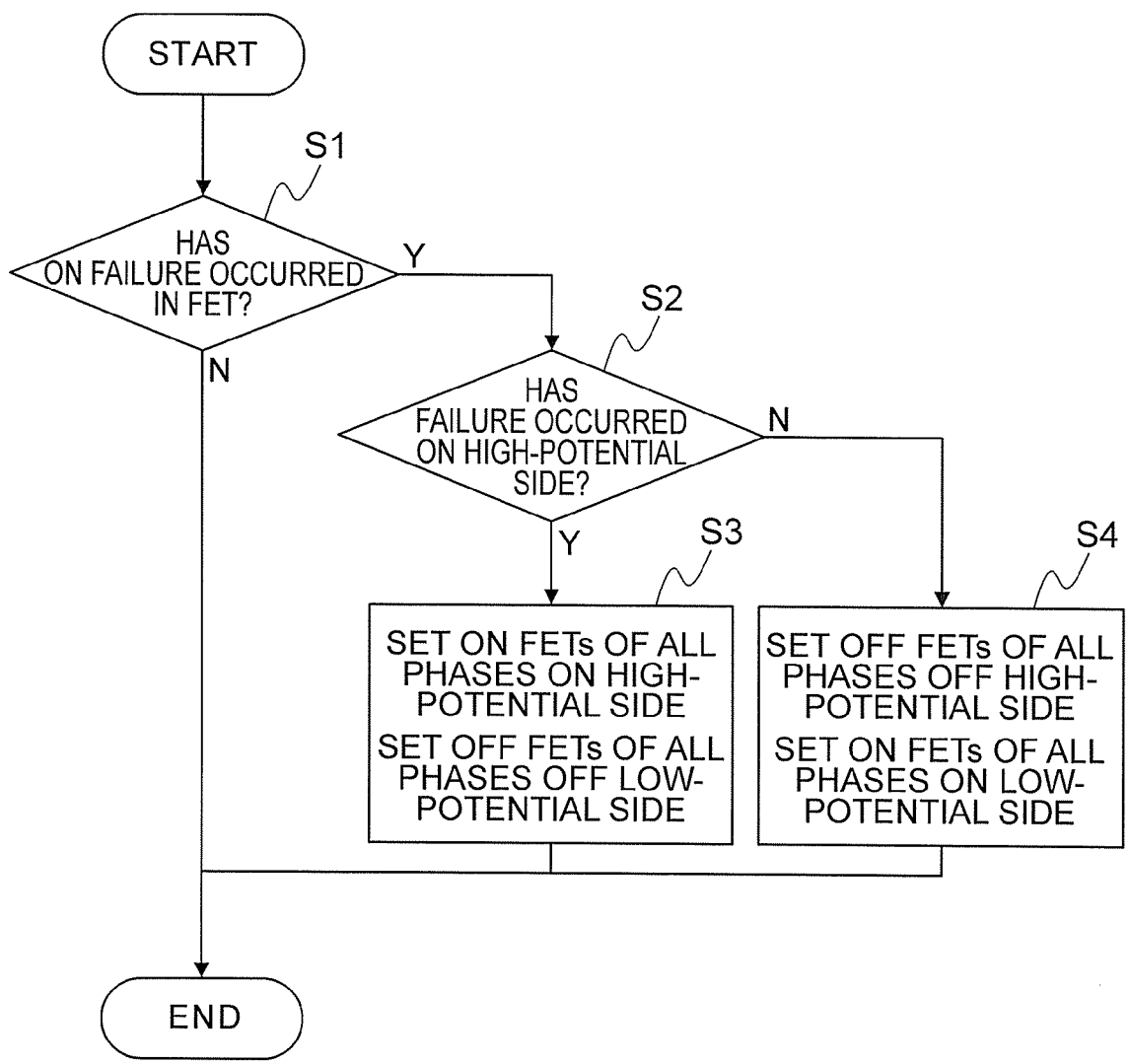
FIG. 3 is an operation flowchart of control performed by current control portion in case of the short-circuit failure according to the present invention.

FIG. 3 is an operation flowchart of the control performed by the current control portion 23. The current control portion 23 performs the control based on a control flow illustrated in FIG. 3. Although FETs are used as the switching elements UP1, UN1, VP1, VN1, WP1, WN1, UP2, UN2, VP2, VN2, WP2, and WN2 in FIG. 1, the processing can be performed in the same manner even with other switching elements such as power transistors or IGBTs. In a conditional branch in Step S1, whether or not an ON failure (short-circuit failure) has occurred in the switching elements is determined. In a conditional branch in Step S2, whether or not the faulty switching element is present on the high-potential side is determined. In processing in Step S3, all the high-potential side switching elements are switched ON, whereas all the low-potential side switching elements are switched OFF. In processing in Step S4, all the high-potential side switching elements are switched OFF, whereas all the low-potential side switching elements are switched ON. In this case, the ON failure occurs in WP1. Therefore, after it is determined as true (Y) in the conditional branch in Step S1 and true (Y) in the conditional branch in Step S2, the processing in Step S3 is performed.

Figure 4:
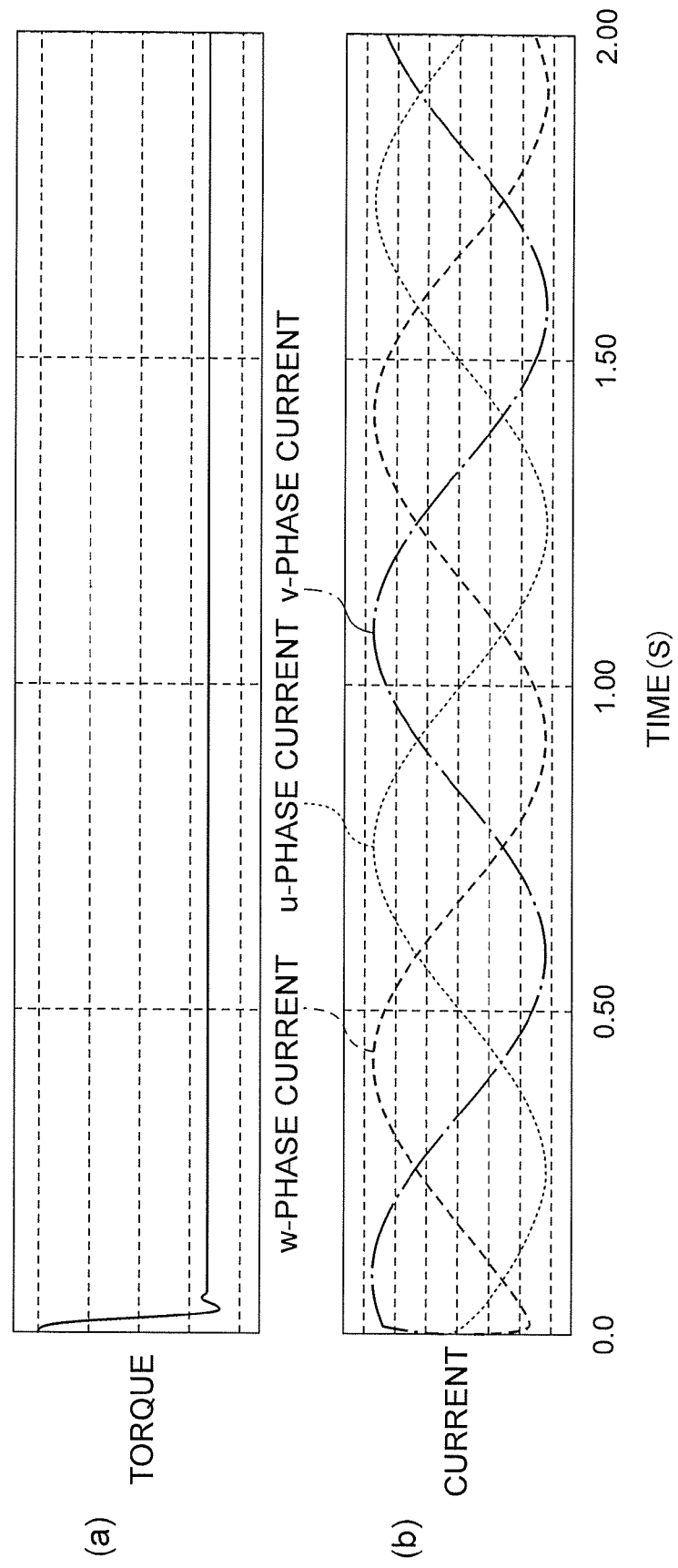
FIG. 4 are graphs showing the relationship between the elapse of time, and the torque and the currents of the respective phases when the control according to a first embodiment of the present invention or the like is applied.

As described above, by setting ON all the switching elements UP1, VP1, and WP1 on the high-potential side, on which the short-circuit failure of the first inverter 21 occurs, and setting OFF all the other switching elements UN1, VN1, and WN1, a fluctuation of the brake torque can be reduced. FIG. 4 are obtained by plotting a generated torque (a) and the currents (b) with respect to elapse of time when the AC rotating machine 5 rotates in a state in which all the switching elements UP1, VP1, and WP1 on the high-potential side, on which the short-circuit failure of the first inverter 21 occurs, are set ON and all the other switching elements UN1, VN1, and WN1 are set ON. The brake torque is constant regardless of the elapse of time, that is, the rotation angle. Therefore, the torque pulsation is not generated due to the brake torque.

The control device for an AC rotating machine described in Patent Literature 1 has only one set of the windings in the AC rotating machine. Therefore, even if the portion at which the short-circuit failure occurs is specified, it is not easy to operate the current in the portion at which the short-circuit failure occurs at a desired value. Therefore, there is a problem in that smooth rotation cannot be maintained due to the generation of the brake torque or the like. In the control device for an AC rotating machine described in this embodiment, however, the AC rotating machine includes the two sets of windings. In accordance with the failure detected by the failure detection portion 28, the current control portion 23 sets ON for the respective phases of the faulty-side inverter on the same potential side, whereas the control for the normal-side inverter (the second inverter 22 in this case because the short-circuit failure occurs in the first inverter 21) except for the faulty-side inverter is continued. In this manner, the constant brake torque is obtained regardless of the elapse of time, that is, the rotation angle, as illustrated in FIG. 4. As a result, the effects of maintaining the smooth rotation are obtained.

The permanent magnets are provided to the rotor of the AC rotating machine 5. Therefore, a direction of a magnetic field generated by the permanent magnets differs depending on the rotation angle. Therefore, a technique of using the AC rotating machine 5 on a dq coordinate system having an axis which coincides with the direction of a magnetic flux is well-known. Here, a d axis is a direction of the magnetic field generated by the rotor, and a q axis is a direction of the torque generated by the AC rotating machine 5. The torque generated by the AC rotating machine 5 is approximately proportional to the q-axis current.

A relational expression between the current and the voltage in the dq coordinate system can be expressed by the following expressions.

$$V_d = Ri_d - \omega L i_q$$

$$V_q = Ri_q + \omega(Li_d + \phi)$$

In the expressions, $V_d$ is a d-axis voltage, $V_q$ is a q-axis voltage, $i_d$ is a d-axis current, $i_q$ is a q-axis current, R is a resistance value, L is an inductance, $\phi$ is a magnetic flux density, and $\omega$ is an rpm. When the respective phases of the faulty-side inverter on the same potential side are set ON, $V_d$ and $V_q$ are both 0. Therefore, $i_d$ and $i_q$ can be expressed by the following expressions.

$$i_d = -(\phi\omega^2 L)/(R^2+\omega^2 L^2)$$

$$i_q = -(\phi\omega R)/(R^2+\omega^2 L^2)$$

Figure 5:
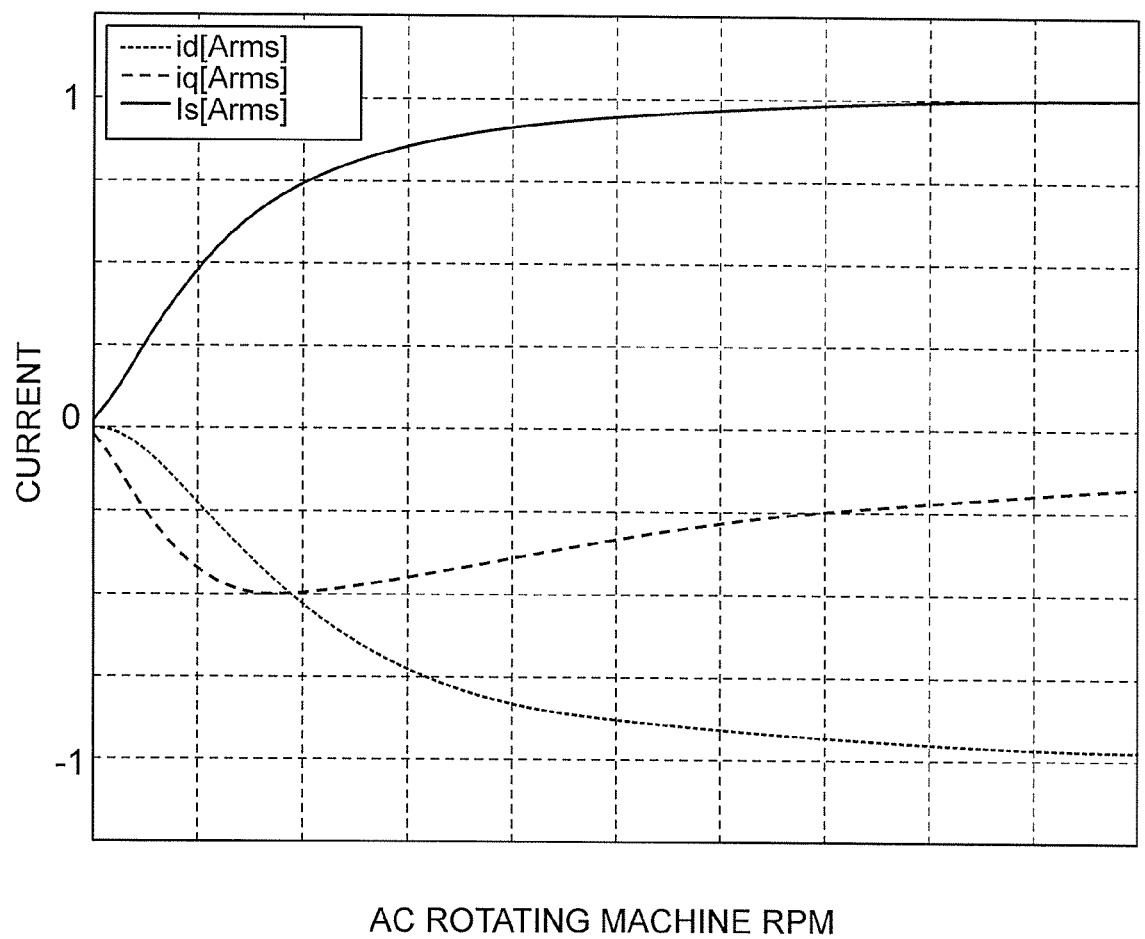
FIG. 5 is a graph showing characteristics of the currents with respect to an AC rotating machine rpm when the control according to the first embodiment of the present invention or the like is applied.

FIG. 5 shows characteristics of the currents with respect to the AC rotating machine rpm signal $\omega$ in which the three phases are short-circuited by setting ON for the respective phases of the faulty-side inverter on the same potential side. A solid line indicating $I_s$ is a square root of sum of squares of the d-axis current indicated by a dotted line and the q-axis current indicated by a broken line with larger dashes than the dotted line. An increase and decrease in the torque generated by the first winding set 15 can be considered as the q-axis current of the first inverter 21. The q-axis current has a negative value, and hence it is understood that the brake torque is generated. According to FIG. 5, the brake torque increases until the rpm reaches a certain rpm, and then decreases.

Figure 6:
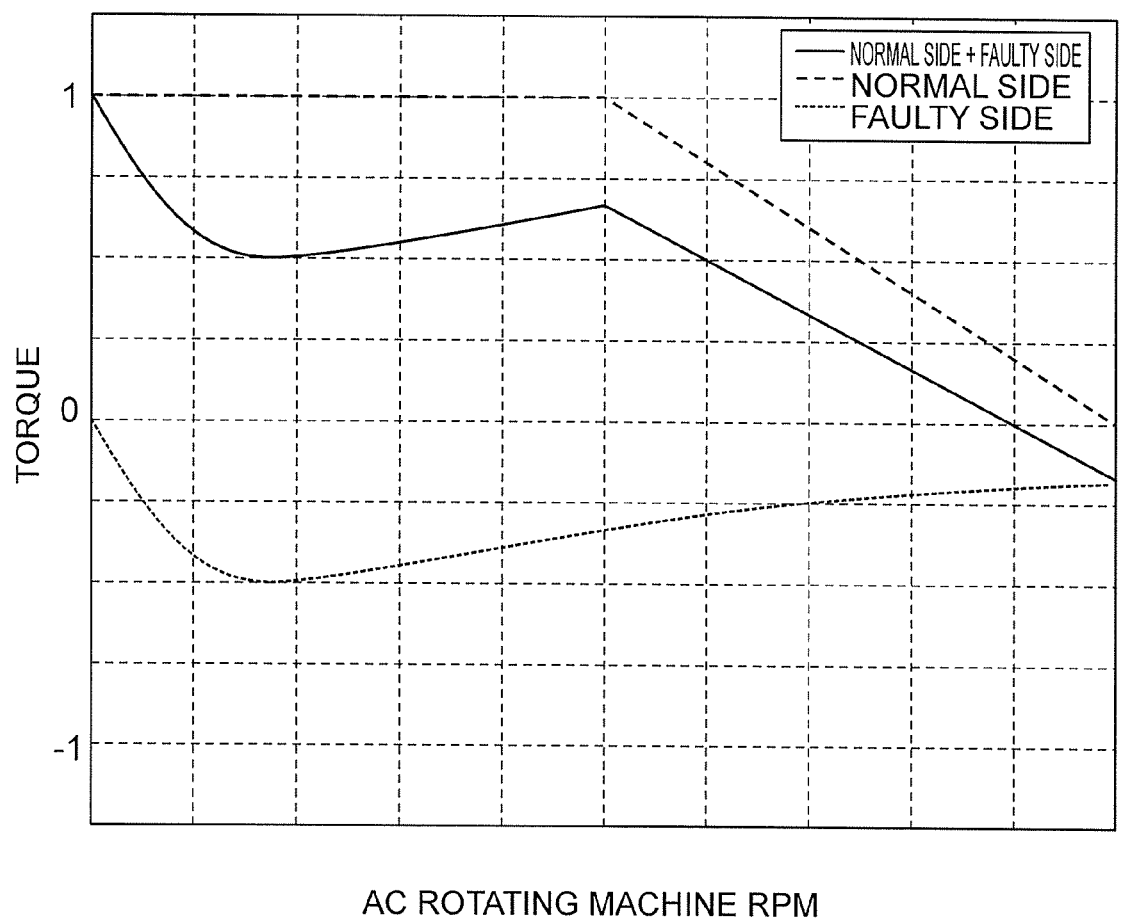
FIG. 6 is a graph showing characteristics of torques with respect to the AC rotating machine rpm when the control according to the first embodiment of the present invention or the like is applied.

FIG. 6 shows the torques with respect to the AC rotating machine rpm signal $\omega$. As described above, the torque which can be generated by the first winding set 15 and the first inverter 21 is the brake torque determined in accordance with the AC rotating machine rpm signal $\omega$ (dotted line of FIG. 6). On the other hand, the second inverter 22 is normal. Therefore, the torque generated by the second winding set 16 remains unchanged from that in the normal state. The generated torque is determined by the q-axis current. Thus, in a region in which the q-axis current does not decrease, a maximum torque can be generated. With a decrease of the q-axis current, the generated torque decreases (broken line of FIG. 6). The torque output from the AC rotating machine 5 is the sum of the torque generated by the first winding set 15 and the torque generated by the second winding set 16, and becomes as indicated by the solid line of FIG. 6.

The related-art control device for an AC rotating machine described in Patent Literature 2 controls the phases including the non-faulty phases so as to reduce or cancel the effects of the brake torque generated from the faulty phase on the non-faulty system by continuously driving the non-faulty phases. Therefore, the control is complex. The control is performed based on the detected rotation angle. Therefore, when the accuracy of the rotation angle is low, there is a problem in that the brake torque is conversely generated instantaneously. However, the control device for an AC rotating machine described in this embodiment can obtain the output torque without a ripple regardless of the rotation angle without complex control.

In this embodiment, a ratio of the output torque from the first winding set 15 and that from the second winding set 16 in the normal state is set to 1. However, the same effects can be obtained even when the torque ratio is different.

Second Embodiment

An overall configuration of a control device for an AC rotating machine according to a second embodiment of the present invention is the same as that illustrated in FIG. 1. An operation of this embodiment is described taking the case, as an example, where a short-circuit failure occurs on a low-potential side of the phase W1 of the first winding drive system. In this case, it is assumed that the first winding set 15 and the second winding set 16 generate the same output torque when the first inverter 21 and the second inverter 22 are both in the normal state.

Figure 7:
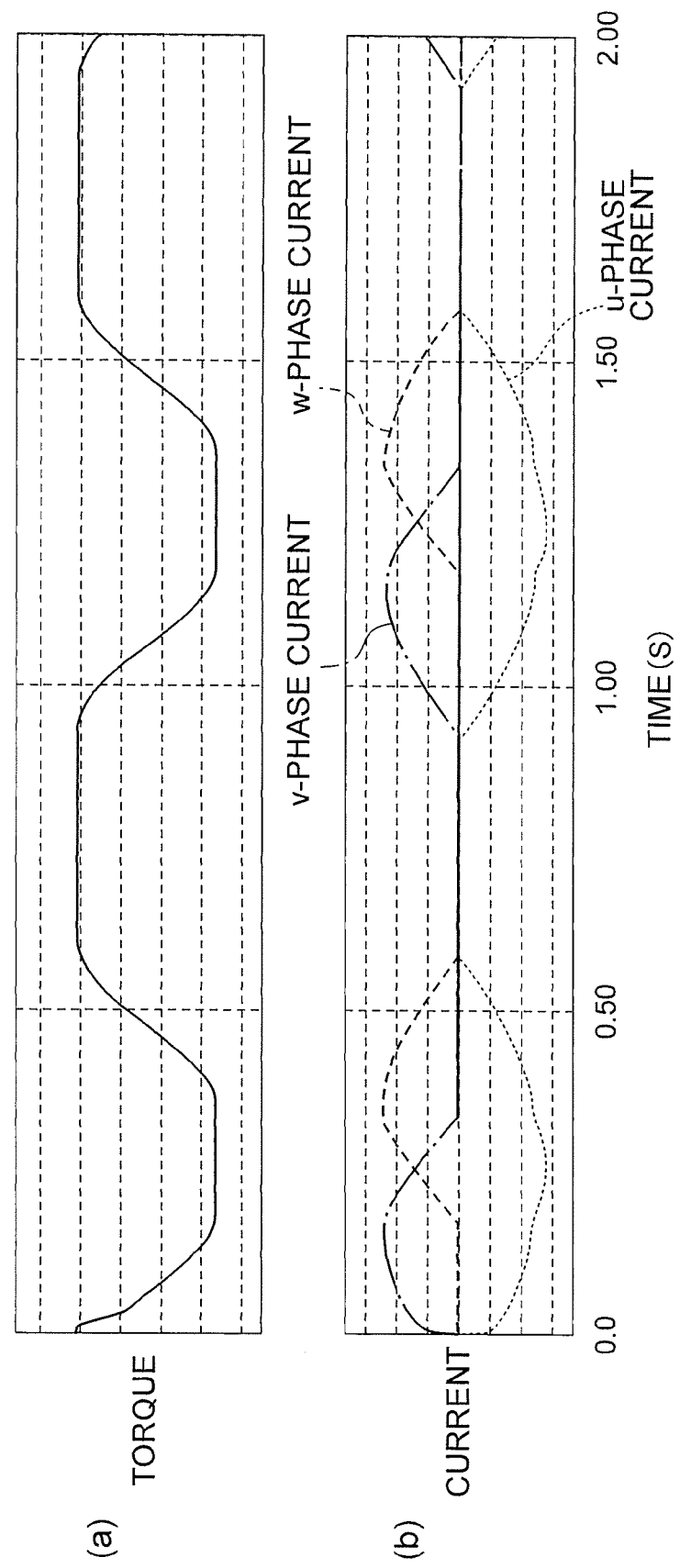
FIG. 7 are graphs showing the relationship between the elapse of time, and the torque and the currents of the respective phases when a short-circuit failure occurs on a low-potential side of the phase W1 of the first winding drive system.

At this time, a state of the switching element WN1 included in the first inverter 21 becomes constantly ON. When the switching elements except for WN1, that is, UP1, UN1, VP1, VN1, and WP1 are in the OFF state, the induced voltage is generated in the first winding set 15. As a result, currents as shown in FIG. 7(b) flow in the first winding set 15. FIGS. 7(a) and (b) show the relationship between the elapse of time, and the torque and the currents when the short-circuit failure occurs on the low-potential side of the phase W1 of the first winding drive system. A u-phase current shown in FIG. 7(b) is the current flowing in the phase U1, a v-phase current is the current flowing in the phase V1, and a w-phase current is the current flowing in the phase W1. The flows of the currents are varied as compared with those in the normal operation. Therefore, a rotation angle region in which the brake torque is generated is generated as shown in FIG. 7(a). There are a rotation angle region in which the brake torque is generated and a rotation angle region in which the torque is zero. Therefore, the torque pulsation is generated to give the feeling of discomfort to the user.

Therefore, the current control portion 23 performs the control based on the control flow of FIG. 3. It is determined as true (Y) in the conditional branch in Step S1, and it is determined as false (N) in the conditional branch in Step S2. Then, the processing in Step S4 is carried out.

As described above, by setting ON all the switching elements UN1, VN1, and WN1 on the low-potential side, on which the short-circuit failure of the first inverter 21 occurs, and setting OFF all the other switching elements UP1, VP1, and WP1, the fluctuation of the brake torque can be reduced. The torque and the current generated in this case are as shown in FIG. 4. The brake torque is constant regardless of the rotation angle. Therefore, the torque pulsation due to the brake torque is not generated.

As in the first embodiment, when the failure detection portion 28 detects the short-circuit failure, the current control portion 23 sets ON for the respective phases on the same potential side as the faulty-potential side of the faulty phase of the faulty-side inverter and sets OFF for the respective phases on the opposite potential side while continuing the control of the normal-side inverter except for the faulty-side inverter. As a result, the output toque without a ripple can be obtained regardless of the elapse of time, that is, the rotation angle as shown in FIGS. 4 and 6 without complex control.

Third Embodiment

An overall configuration of a control device for an AC rotating machine according to a third embodiment of the present invention is the same as that illustrated in FIG. 1. An operation of this embodiment is described taking the case, as an example, where an open-circuit failure occurs on a high-potential side of the phase W1 of the first winding drive system. In this case, it is assumed that the first winding set 15 and the second winding set 16 generate the same output torque when the first inverter 21 and the second inverter 22 are both in the normal state.

At this time, the state of the switching element WP1 included in the first inverter 21 becomes OFF constantly. When the switching elements except for WP1, that is, UP1, UN1, VP1, VN1, and WN1 are in the OFF state, the current does not flow through the first winding set 15. Therefore, the brake torque is not generated.

Figure 8:
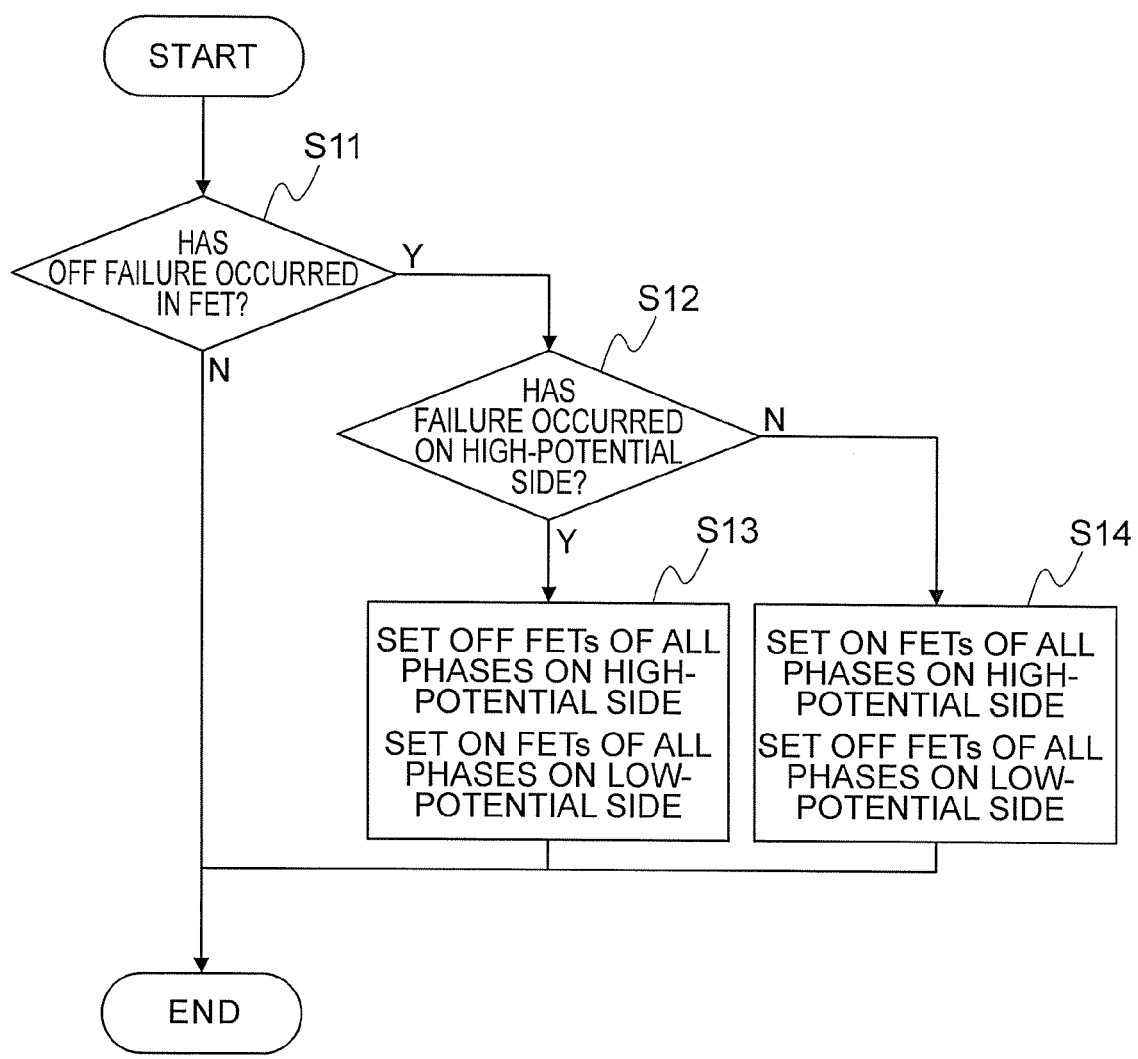
FIG. 8 is an operation flowchart of the control performed by the current control portion in case of an open-circuit failure according to the present invention.

FIG. 8 illustrates an operation flowchart of the control performed by the current control portion 23. The current control portion 23 executes the control based on the control flow illustrated in FIG. 8 to generate a constant brake torque to cause the user to actively recognize the failure. In a conditional branch in Step S11, it is determined whether or not an open-circuit (OFF) failure occurs in the switching elements. In a conditional branch in Step S12, it is determined whether or not the faulty switching element is on the high-potential side. In processing in Step S13, all the high-potential side switching elements are turned OFF, whereas all the low-potential side switching elements are turned ON. In processing in Step S14, all the high-potential side switching elements are turned ON, whereas all the low-potential side switching elements are turned OFF. In this case, the OFF failure occurs in WP1. Therefore, after it is determined as true (Y) in the conditional branch in Step S11 and it is determined as true (Y) in the conditional branch in Step S12, the processing S13 is performed.

As described above, by setting OFF all the switching elements UP1, VP1, and WP1 on the high-potential side, on which the open-circuit failure of the first inverter 21 occurs, and setting ON all the other switching elements UN1, VN1, and WN1, the given brake torque can be generated.

In the control device for an AC rotating machine described in the third embodiment, when the failure detection portion 28 detects the open-circuit failure, the current control portion 23 sets OFF for the respective phases on the same potential side as the faulty-potential side of the faulty phase of the faulty-side inverter and sets ON for the respective phases on the opposite potential side while the control on the normal-side inverter except for the faulty-side inverter is continued. As a result, in the same manner as that of the short-circuit failure described in the first embodiment, the output torque without a ripple can be obtained regardless of elapse of time, that is, the rotation angle, as shown in FIGS. 4 and 6, without complex control.

Fourth Embodiment

An overall configuration of a control device for an AC rotating machine according to a fourth embodiment of the present invention is the same as that illustrated in FIG. 1. The case where the open-circuit failure occurs on the high-potential side is described in the above-mentioned third embodiment. Even when the open-circuit failure occurs on the low-potential side, the given brake torque is generated. The ON/OFF setting of the switching elements in the processing in Step S14 performed based on the control flow of FIG. 8 becomes opposite to that of the third embodiment. Specifically, by setting OFF all the switching elements UN1, VN1, and WN1 on the low-potential side, on which the open-circuit failure of the first inverter 21 occurs, and setting ON all the other switching elements UP1, VP1, and WP1, the given brake torque can be generated.

In the control device for an AC rotating machine described in the fourth embodiment, when the failure detection portion 28 detects the open-circuit failure, the current control portion 23 sets OFF for the respective phases on the same potential side as the faulty-potential side of the faulty phase of the faulty-side inverter and sets ON for the respective phases on the opposite potential side while the control on the normal-side inverter except for the faulty-side inverter is continued. As a result, the output torque without a ripple can be obtained regardless of elapse of time, that is, the rotation angle, as shown in FIGS. 4 and 6, without complex control.

Fifth Embodiment

Although the current control portion 23 performs the control so that the normal-side inverter operates in the same manner as in the normal state in the first to fourth embodiments described above, current control portion 23a may substitute for the current control portion 23 so as to perform control to correct the current of the normal-side inverter when a failure occurs.

Figure 9:
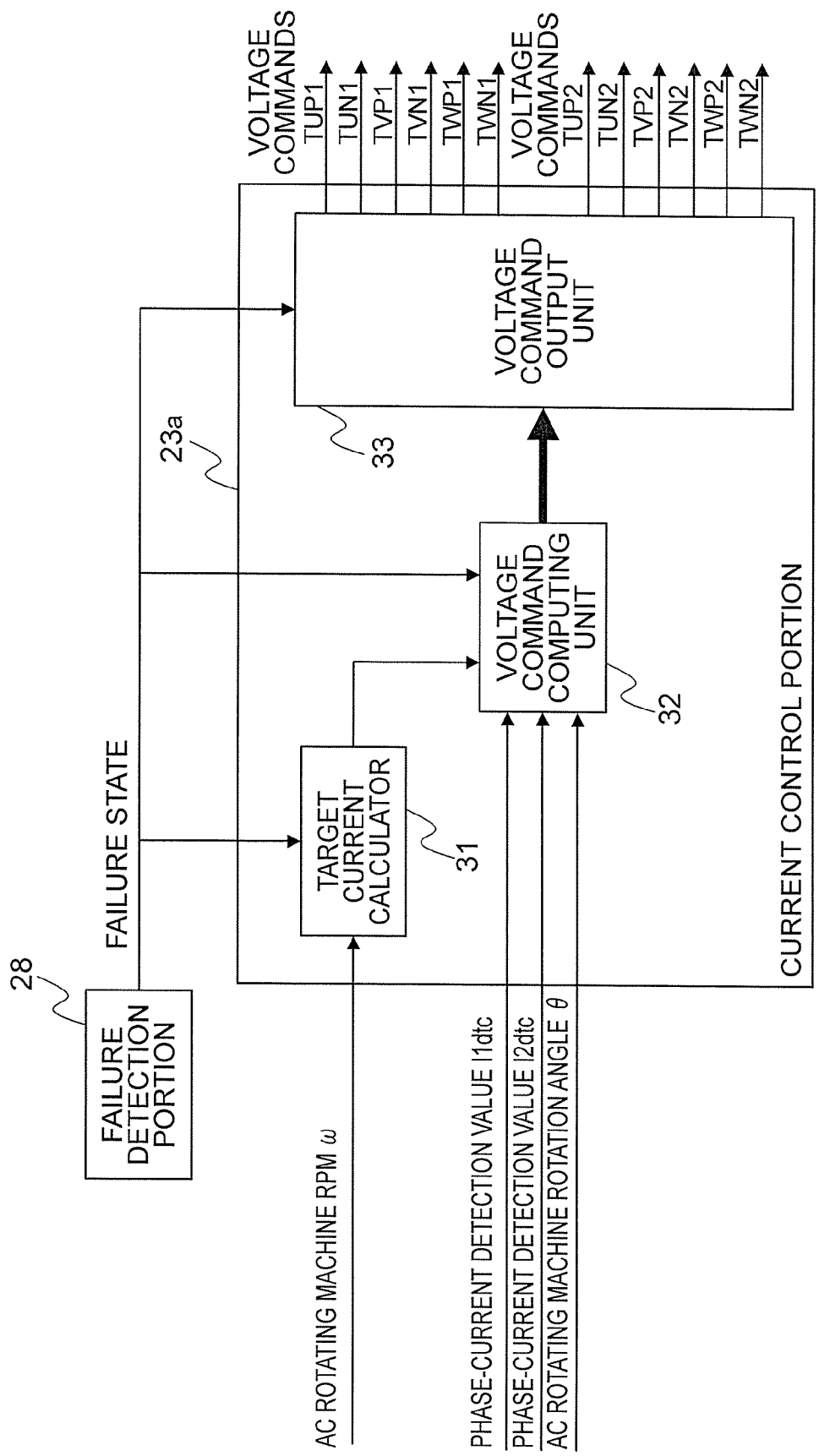
FIG. 9 is a diagram showing an example of an internal configuration of current control portion of a control device for an AC rotating machine according to a fifth embodiment or the like of the present invention.

An overall configuration of a control device for an AC rotating machine according to a fifth embodiment of the present invention is the same as that illustrated in FIG. 1. FIG. 9 is a diagram illustrating an example of an internal configuration of the current control portion 23a according to the fifth embodiment, which is provided as the current control portion 23 illustrated in FIG. 1. A target current calculator 31 calculates a target current for the normal-side inverter based on the failure state obtained from the failure detection portion 28 and the AC rotating machine rpm ω obtained from the AC rotating machine rpm detection portion 27. A voltage command computing unit 32 computes a voltage command based on the failure state obtained from the failure detection portion 28, the target current calculated by the target current calculator 31, the phase-current detection value I1dtc from the current detection circuits CT11 to CT31 or the phase-current detection value I2dtc from the current detection circuits CT12 to CT32, and the AC rotating machine rotation angle θ obtained from the AC rotating machine rotation angle detection portion 26. A technique of using the AC rotating machine 5 in the dq coordinate system having the axis which coincides with the direction of the magnetic flux is well-known. For example, there is PI control performed based on a difference between the target current and an actual current.

A voltage command output unit 33 outputs the voltage commands TUP1, TUN1, TVP1, TVN1, TWP1, TWN1, TUP2, TUN2, TVP2, TVN2, TWP2, and TWN2 to be given to the respective switching elements based on the failure state obtained from the failure detection portion 28 and the voltage command obtained by the voltage command computing unit 32. In the case of the faulty-side inverter, regardless of the contents calculated by the target current calculator 31 and the voltage command computing unit 32, depending on the failure state obtained from the failure detection portion 28, the same potential side is set ON and the opposite potential side is set OFF in the case of the short-circuit failure, and the same potential side is set OFF and the opposite potential side is set ON in the case of the open-circuit failure. In this manner, the voltage commands are determined. The calculations by the target current calculator 31 and the voltage command computing unit 32 need to be performed only for the non-faulty side inverter.

Now, an operation of this embodiment is described taking the case, as an example, where the short-circuit failure occurs on the high-potential side of the phase W1 of the first winding drive system. As in the first embodiment described above, by setting ON all the switching elements UP1, VP1, and WP1 on the high-potential side, on which the short-circuit failure of the first inverter 21 occurs, and setting OFF all the other switching elements UN1, VN1, and WN1 in accordance with the operation flowchart of the control illustrated in FIG. 3, a fluctuation of the brake torque due to the rotation angle is reduced. The voltage commands TUP1, TUN1, TVP1, TVN1, TWP1, and TWN1 are output by the voltage command output unit 33 to the first switching element drive circuit 24.

Figure 11:
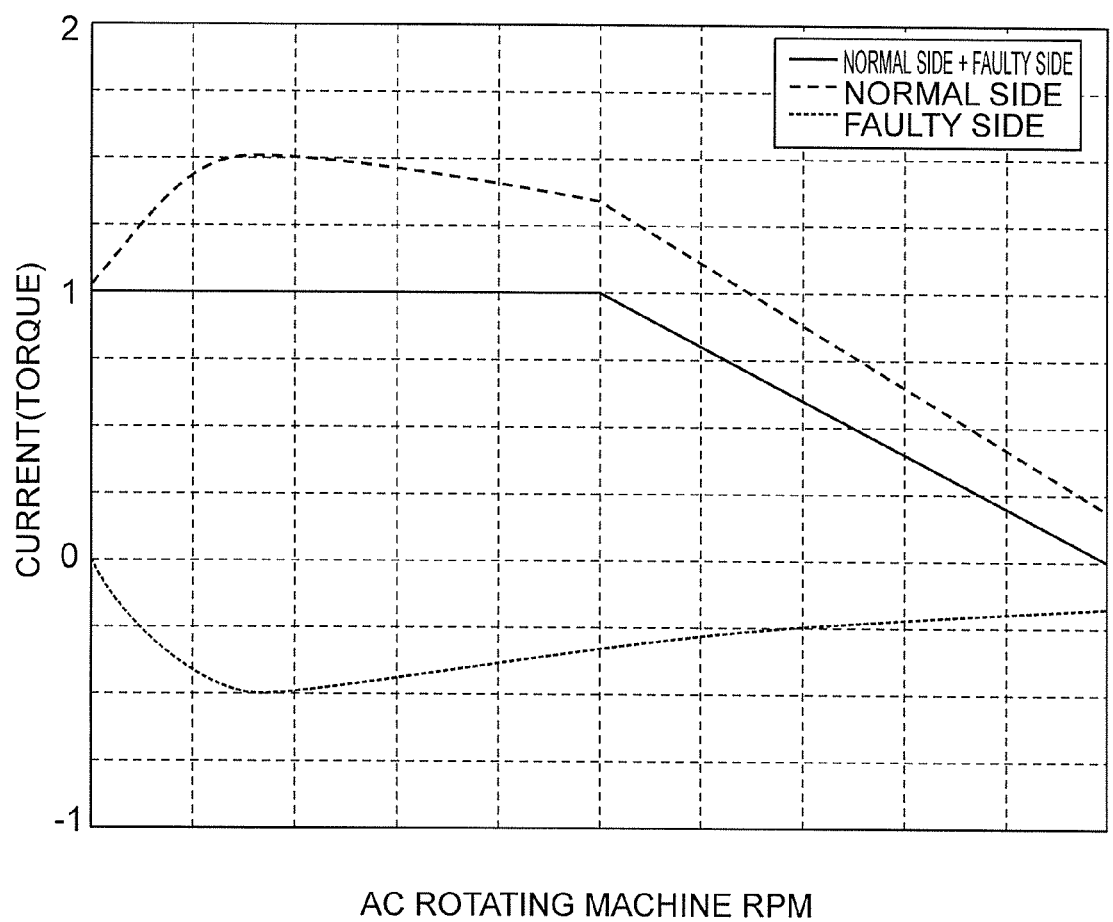
FIG. 11 is a graph showing an example of characteristics of a current (torque) with respect to the AC rotating machine rpm when control according to the fifth embodiment or the like of the present invention is applied.

At this time, the brake torque in accordance with the AC rotating machine rpm, as indicated by the dotted line (with shorter dashes) of FIG. 11 is generated in the first winding set 15 and the first inverter 21. FIG. 11 shows the currents (torques) with respect to the AC rotating machine rpm signal ω. When the same control is performed for the normal-side inverter regardless of whether or not there is a failure, a total torque obtained from the normal side and the faulty side changes in accordance with the AC rotating machine rpm as in the first embodiment (solid line of FIG. 6) under the effects of the brake torque which changes in accordance with the control. Therefore, by outputting the output torque as indicated by the broken line (with larger dashes) of FIG. 11 on the normal side, the total torque as indicated by the solid line of FIG. 11 can be output. As described above, the torque is proportional to the q-axis current. Therefore, the solid line of FIG. 11 can be regarded as indicating a target value of the q-axis current.

Figure 10:
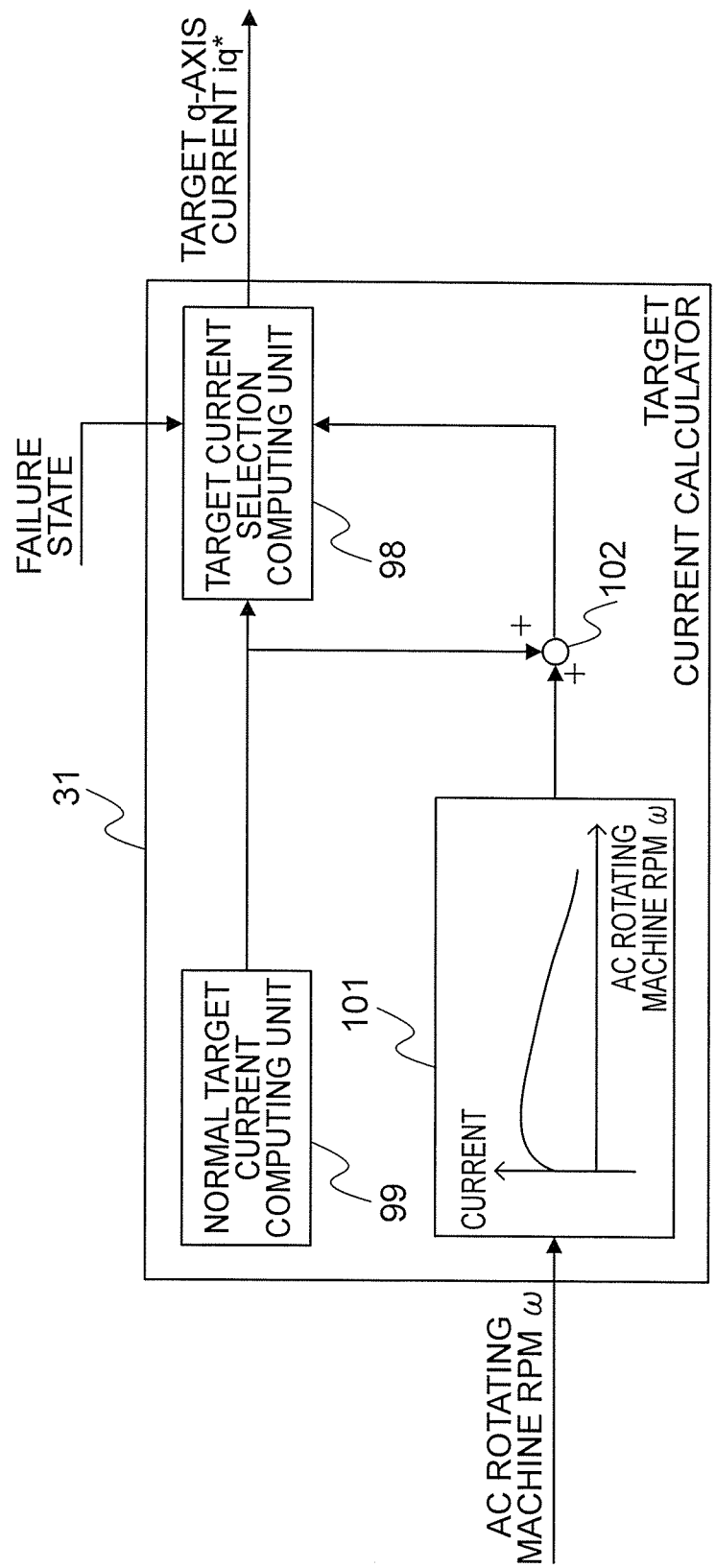
FIG. 10 is a diagram illustrating an example of an internal configuration of a target current calculator illustrated in FIG. 9 according to the fifth embodiment of the present invention.

FIG. 10 illustrates an example of an internal configuration of the target current calculator 31 illustrated in FIG. 9 according to the fifth embodiment. In the target current calculator 31, a normal target current computing unit 99 outputs a target q-axis current in the normal state. A corrected target q-axis current is calculated by using a conversion table 101 from the AC rotating machine rpm signal ω calculated by the AC rotating machine rpm detection portion 27. As the conversion table 101, for example, a characteristic indicated by the broken line (with larger dashes) of FIG. 11 may be given. The conversion table 101 includes, for example, a conversion unit for converting the AC rotating machine rpm into the corrected target q-axis current value in accordance with a conversion table prestored in a memory (not shown) or the like or a conversion unit for obtaining the corrected target q-axis current value by calculation in accordance with a conversion formula provided in advance. Then, the corrected target q-axis current is added to the target q-axis current in the normal state by an adder 102 to calculate a target q-axis current in case of a failure.

A target current selection computing unit 98 outputs the target q-axis current in case of a failure or the target q-axis current in the normal state in accordance with the failure state from the failure detection portion 28. In the fifth embodiment, the failure occurs in the first winding drive system. Therefore, the target current selection computing unit 98 selects the target q-axis current in case of a failure as the target q-axis current for the first inverter 21. The second winding drive system is normal. Therefore, the target current selection computing unit 98 selects the target q-axis current in the normal state from the normal target current computing unit 99 as the target q-axis current for the second inverter 22.

A target q-axis current $i_q^*$ calculated by the target current calculator 31 and the phase-current detection value I2dtc are given as inputs so that the voltage command computing unit 32 calculates the voltage commands. Based on the calculated voltage commands, the voltage commands TUP2, TUN2, TVP2, TVN2, TWP2, and TWN2 are output by the voltage command output unit 33 to the second switching element drive circuit 25.

In the manner described above, when the failure detection portion 28 detects the failure, the current of the normal-side inverter except for the faulty-side inverter can be corrected by the target current calculator 31 having the configuration illustrated in FIG. 10 in accordance with the AC rotating machine rpm signal ω obtained by the AC rotating machine rpm detection portion 27 so that the control is performed.

Figure 12:
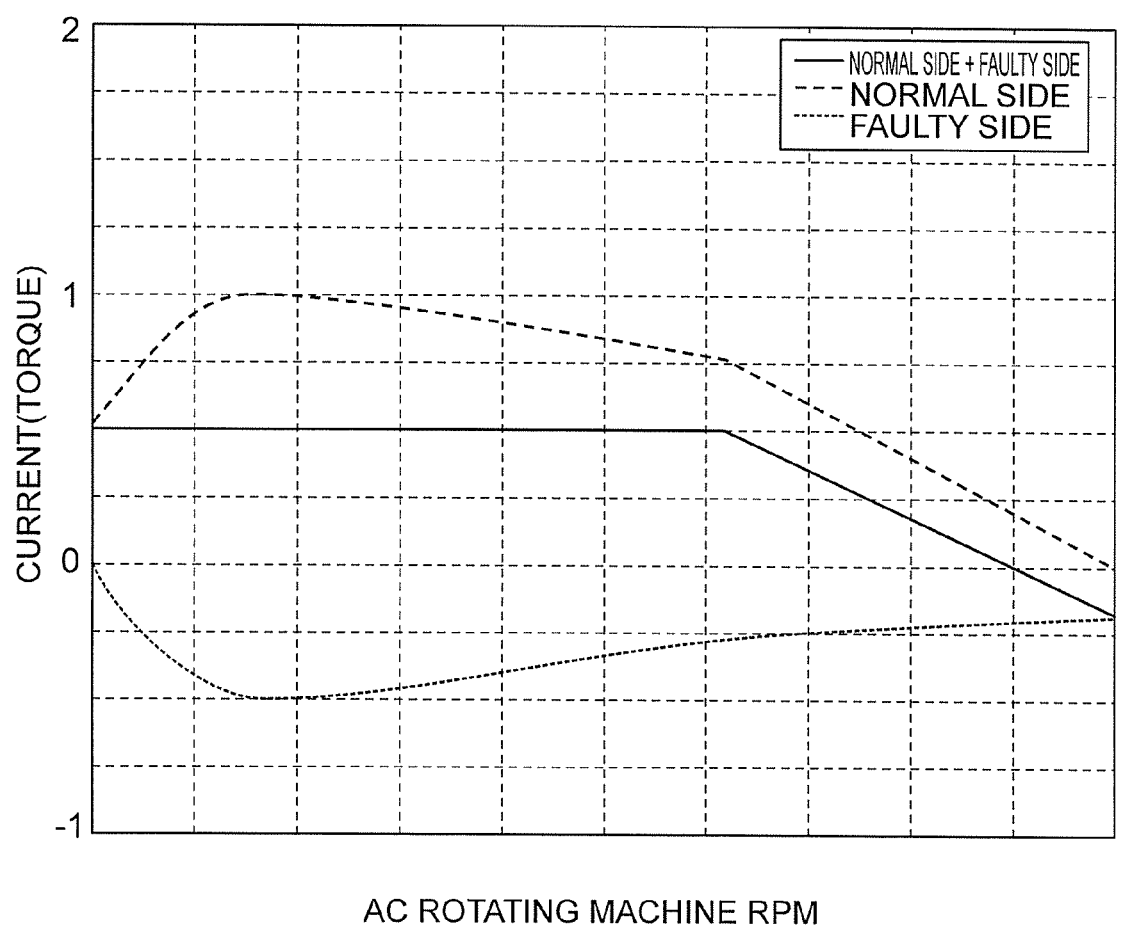
FIG. 12 is a graph showing another example of the characteristics of the current (torque) with respect to the AC rotating machine rpm when the control according to the fifth embodiment or the like of the present invention is applied.

Although the example where the control is performed so that the total torque becomes 1 is shown in FIG. 11, other target values may be used as long as the torque is within the range in which the torque can be output by the normal-side inverter and winding set, as shown in FIG. 12.

Although the case of the short-circuit failure has been described in the fifth embodiment, the given brake torque can be obtained even in the case of the open-circuit failure by setting OFF the same potential side of the respective phases of the faulty-side inverter and setting ON the opposite potential side while continuing the control on the normal-side inverter except for the faulty-side inverter by the current control portion 23 in accordance with the failure detected by the failure detection portion 28, as described in the third or fourth embodiment. By performing the same control, the effects of obtaining the output torque without a ripple regardless of the rotation angle without complex control can be provided.

Sixth Embodiment

In the first to fifth embodiments described above, the normal-side inverter rotates the AC rotating machine 5 against the brake torque of the faulty-side inverter. Therefore, a heat generation amount changes in accordance with a change of the rotation. Therefore, by lowering the output torque of the AC rotating machine 5 in accordance with the AC rotating machine rpm signal ω, an increase in rotation can be suppressed to reduce an increase in temperature due to the heat generation amount.

An overall configuration of a control device for an AC rotating machine according to a sixth embodiment of the present invention is the same as that illustrated in FIG. 1, and a configuration of current control portion is the same as that illustrated in FIG. 9. Now, an operation of the sixth embodiment is described taking the case, as an example, where a short-circuit failure occurs on the high-potential side of the phase W1 of the first winding drive system.

As in the first embodiment described above, by setting ON all the switching elements UP1, VP1, and WP1 on the high-potential side, on which the short-circuit failure of the first inverter 21 occurs, and setting OFF all the other switching elements UN1, VN1, and WN1 in accordance with the operation flowchart of the control illustrated in FIG. 3, a fluctuation of the brake torque due to the rotation angle is reduced. The voltage commands TUP1, TUN1, TVP1, TVN1, TWP1, and TWN1 are output by the voltage command output unit 33 of FIG. 9 to the first switching element drive circuit 24.

At this time, the brake torque in accordance with the AC rotating machine rpm, as indicated by the dotted line (with shorter dashes) of FIG. 11 is generated in the first winding set 15 and the first inverter 21. When the same control is performed for the normal-side inverter regardless of whether or not there is a failure, a total torque obtained from the normal side and the faulty side changes in accordance with the AC rotating machine rpm as in the first embodiment described above (solid line of FIG. 6) under the effects of the brake torque that changes in accordance with the AC rotating machine rpm. Therefore, by outputting the output torque as indicated by the broken line (with larger dashes) of FIG. 11 on the normal side, the total torque as indicated by the solid line of FIG. 11 can be output. As described above, the torque is proportional to the q-axis current. Therefore, the solid line of FIG. 11 can be regarded as indicating a target value of the q-axis current.

Figure 13:
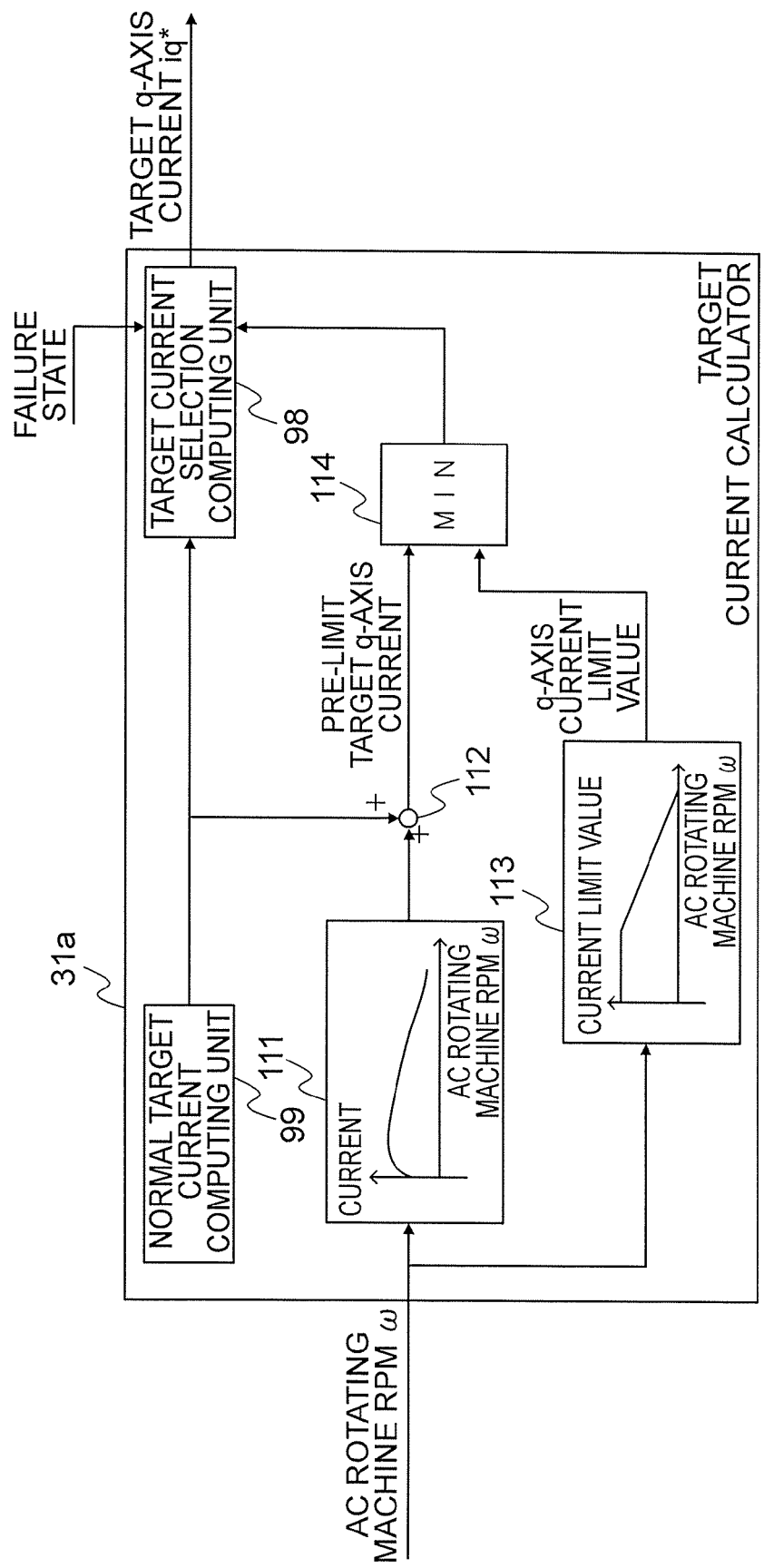
FIG. 13 is a diagram illustrating an example of an internal configuration of the target current calculator illustrated in FIG. 9 according to a sixth embodiment of the present invention.

FIG. 13 illustrates an example of an internal configuration of the target current calculator 31a according to the sixth embodiment. In the target current calculator 31a, the normal target current computing unit 99 outputs a target q-axis current in the normal state. A corrected target q-axis current is calculated by using a conversion table 111 from the AC rotating machine rpm signal ω calculated by the AC rotating machine rpm detection portion 27. As the conversion table 111, for example, a characteristic indicated by the broken line (with larger dashes) of FIG. 11 may be given. Then, the corrected target q-axis current is added to the target q-axis current in the normal state by an adder 112 to calculate a pre-limit target q-axis current.

On the other hand, a q-axis current limit value is calculated from the AC rotating machine rpm signal ω calculated by the AC rotating machine rpm detection portion 27 based on a conversion table 113. A loss power due to friction is expressed by the product of a friction torque and the AC rotating machine rpm. It can be considered that the loss power due to friction is converted into heat. An allowable heat generation amount=loss power differs for each AC rotating machine rpm. By dividing the allowable loss power by the AC rotating machine rpm, an allowable friction torque is determined. The target current limit value determined in accordance with the allowable friction torque only needs to be prepared as the conversion table 113. A method for specifically configuring the conversion tables (conversion units) 111, 113 and the like is the same as, for example, that described for the table 101 of FIG. 10 (the same applies to a method for specifically configuring each of the conversion tables described below).

A target q-axis current in case of a failure is calculated by a minimum-value selecting unit (MIN) 114 from the pre-limit target q-axis current calculated by the adder 112 and the q-axis current limit value calculated by the conversion table 113. The target current selection computing unit 98 outputs the target q-axis current in case of a failure or the target q-axis current in the normal state in accordance with the failure state. In the sixth embodiment, the failure occurs in the first winding drive system. Therefore, the target current selection computing unit 98 selects the target q-axis current in case of a failure as the target q-axis current for the first inverter 21. The second winding drive system is normal. Therefore, the target current selection computing unit 98 selects the target q-axis current in the normal state as the target q-axis current for the second inverter 22.

In the current control portion 23a of FIG. 9, a target q-axis current $i_q^*$ calculated by the target current calculator 31a and the phase-current detection value I2dtc are given as inputs so that the voltage command computing unit 32 calculates the voltage commands. Based on the calculated voltage commands, the voltage commands TUP2, TUN2, TVP2, TVN2, TWP2, and TWN2 are output by the voltage command output unit 33 to the second switching element drive circuit 25.

In the manner described above, when the failure detection portion 28 detects the failure, the current of the normal-side inverter except for the faulty-side inverter can be reduced by providing the target current calculator 31a having the configuration illustrated in FIG. 13 in accordance with the AC rotating machine rpm signal ω obtained by the AC rotating machine rpm detection portion 27 so that the control is performed.

Although the two tables, that is, the conversion tables 111 and 113 are used in the sixth embodiment, the tables may be united into one because the conversion tables are based on the same input signals. Moreover, although the conversion table 113 is used by using the AC rotating machine rpm signal ω itself as the input, the friction torque and the loss power may be calculated from the AC rotating machine rpm signal ω so as to determine the current limit value in accordance therewith.

Seventh Embodiment

Although the current limit value is calculated from the AC rotating machine rpm signal ω in the sixth embodiment described above, a duration time may also be taken into consideration so that the current limit value is calculated from an AC rotating machine rpm integrated value within a predetermined period of time.

An overall configuration of a control device for an AC rotating machine according to a seventh embodiment of the present invention is the same as that illustrated in FIG. 1, and a configuration of current control portion is the same as that illustrated in FIG. 9. Now, an operation of the seventh embodiment is described taking the case, as an example, where a short-circuit failure occurs on the high-potential side of the phase W1 of the first winding drive system as in the sixth embodiment.

As in the first embodiment described above, by setting ON all the switching elements UP1, VP1, and WP1 on the high-potential side, on which the short-circuit failure of the first inverter 21 occurs, and setting OFF all the other switching elements UN1, VN1, and WN1 in accordance with the operation flowchart of the control illustrated in FIG. 3, a fluctuation of the brake torque due to the rotation angle is reduced. The voltage commands TUP1, TUN1, TVP1, TVN1, TWP1, and TWN1 are output by the voltage command output unit 33 of FIG. 9 to the first switching element drive circuit 24.

Figure 14:
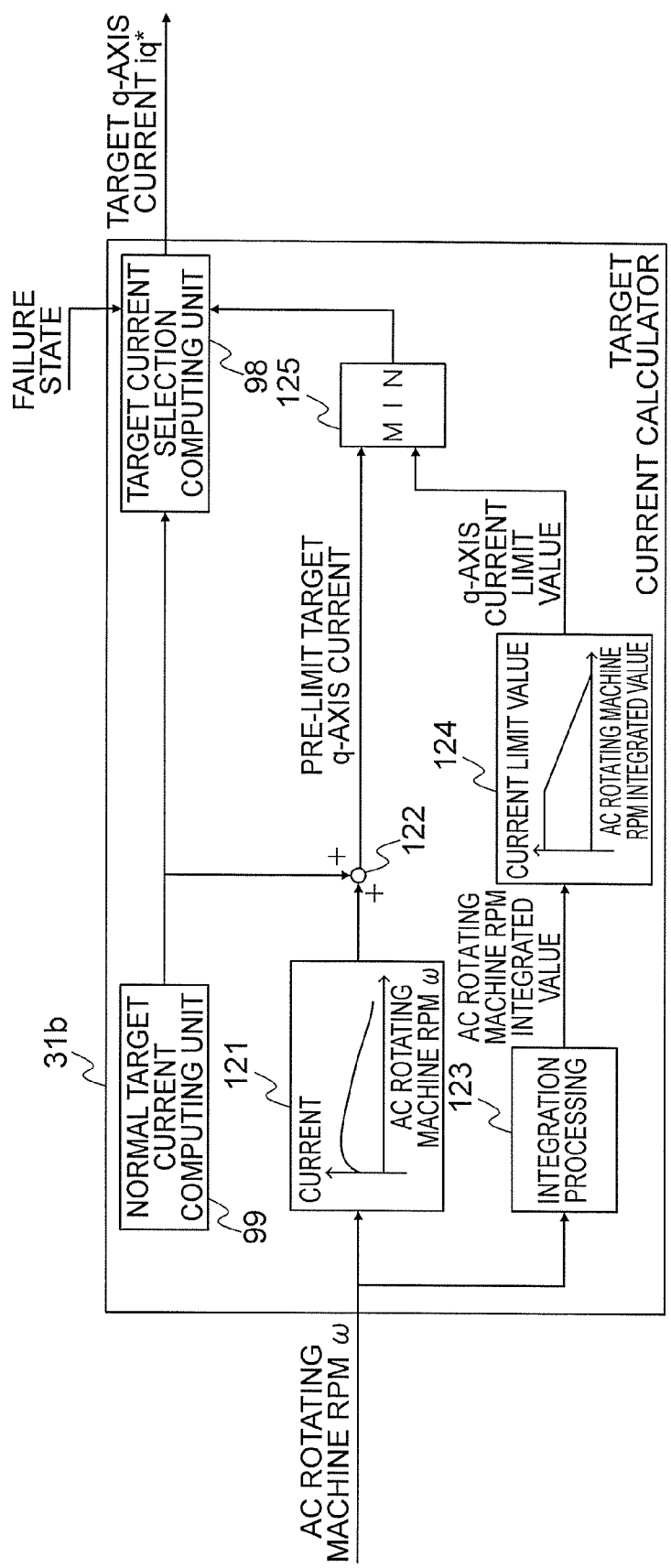
FIG. 14 is a diagram illustrating an example of an internal configuration of the target current calculator illustrated in FIG. 9 according to a seventh embodiment of the present invention.

FIG. 14 illustrates an example of an internal configuration of a target current calculator 31b according to the seventh embodiment. In the target current calculator 31b, the normal target current computing unit 99 outputs a target q-axis current in the normal state. A corrected target q-axis current is calculated by using a conversion table 121 from the AC rotating machine rpm signal ω calculated by the AC rotating machine rpm detection portion 27. As the conversion table 121, for example, a characteristic indicated by the broken line (with larger dashes) of FIG. 11 may be given. Then, the corrected target q-axis current is added to the target q-axis current in the normal state by an adder 122 to calculate a pre-limit target q-axis current.

On the other hand, the q-axis current limit value is calculated as follows. First, the AC rotating machine rpm integrated value within a predetermined period of time is calculated by an integration processing unit 123. For example, a transfer function of the integration processing unit 123 is given by:

$$\sum_{i=0}^{n-1} z^{-n}$$ [Math. 1]

In the function, $Z^{-1}$ indicates a previous value, and n indicates the number of times of integration of the AC rotating machine rpm signal ω. The integration time is defined by n.

The q-axis current limit value is calculated based on a conversion table 124 from the AC rotating machine rpm integrated value calculated by the integration processing unit 123. In this case, the conversion table 124 using the AC rotating machine rpm integrated value is used, considering a change of the friction torque with respect to the AC rotating machine rpm as being extremely small and the loss energy due to the friction as being proportional to the AC rotating machine rpm. However, a conversion table using an integrated value of the friction torque calculated from the AC rotating machine rpm signal ω may be used. Alternatively, a conversion table using an integrated value of the loss power due to the friction obtained from the friction torque and the AC rotating machine rpm signal ω may be used.

A target q-axis current in case of a failure is calculated by a minimum-value selecting unit (MIN) 125 from the pre-limit target q-axis current calculated by the adder 122 and the q-axis current limit value calculated by the conversion table 124. The target current selection computing unit 98 outputs the target q-axis current in case of a failure or the target q-axis current in the normal state in accordance with the failure state. In the seventh embodiment, the failure occurs in the first winding drive system. Therefore, the target current selection computing unit 98 selects the target q-axis current in case of a failure as the target q-axis current for the first inverter 21. The second winding drive system is normal. Therefore, the target current selection computing unit 98 selects the target q-axis current in the normal state as the target q-axis current for the second inverter 22.

In the current control portion 23a of FIG. 9, a target q-axis current $i_q^*$ calculated by the target current calculator 31b and the phase-current detection value I2dtc are given as inputs so that the voltage command computing unit 32 calculates the voltage commands. Based on the calculated voltage commands, the voltage commands TUP2, TUN2, TVP2, TVN2, TWP2, and TWN2 are output by the voltage command output unit 33 to the second switching element drive circuit 25.

In the manner described above, when the failure detection portion 28 detects the failure, the current of the normal-side inverter except for the faulty-side one can be decreased by providing the target current calculator 31b having the configuration illustrated in FIG. 14 in accordance with a time period in which the AC rotating machine rpm signal ω obtained by the AC rotating machine rpm detection portion 27 is generated so that the control is performed.

Figure 15:
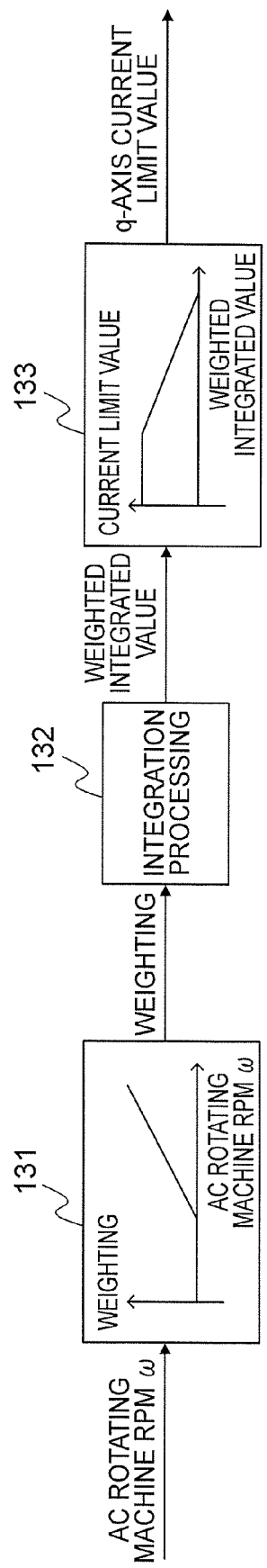
FIG. 15 is a diagram illustrating a variation of the internal configuration of the target current calculator illustrated in FIG. 9 according to the seventh embodiment of the present invention.

In place of the integration processing unit 123 and the conversion table 124 used in this case, the current limit value may be calculated by using weighted data as illustrated in FIG. 15. In this case, in consideration of the characteristics of the friction torque with respect to the AC rotating machine rpm, a weighted conversion table (conversion unit) 131 with respect to the AC rotating machine rpm ω is provided so that the AC rotating machine rpm ω is converted into a weighted value based on the conversion table 131. Then, the weighted data within a predetermined period of time is integrated by the integration processing unit 132. From the integrated weighted value, the q-axis current limit value is calculated based on a conversion table 133. In the seventh embodiment, the target q-axis current or the q-axis current limit value is calculated by using the conversion tables. However, the conversion tables are not required to be used as long as a method providing the same effects is used.

Eighth Embodiment

The brake torque generated on the faulty side is determined in accordance with the current of the faulty-side inverter. Therefore, the heat generation amount can be reduced by suppressing the increase in rotation in accordance with the current of the faulty-side inverter.

An overall configuration of a control device for an AC rotating machine according to an eighth embodiment of the present invention is the same as that illustrated in FIG. 1, and a configuration of current control portion is the same as that illustrated in FIG. 9. Now, an operation of the eighth embodiment is described taking the case, as an example, where a short-circuit failure occurs on the high-potential side of the phase W1 of the first winding drive system.

As in the first embodiment described above, by setting ON all the switching elements UP1, VP1, and WP1 on the high-potential side, on which the short-circuit failure of the first inverter 21 occurs, and setting OFF all the other switching elements UN1, VN1, and WN1 in accordance with the operation flowchart of the control illustrated in FIG. 3, a fluctuation of the brake torque due to the rotation angle is reduced. The voltage commands TUP1, TUN1, TVP1, TVN1, TWP1, and TWN1 are output by the voltage command output unit 33 of FIG. 9 to the first switching element drive circuit 24.

Figure 16:
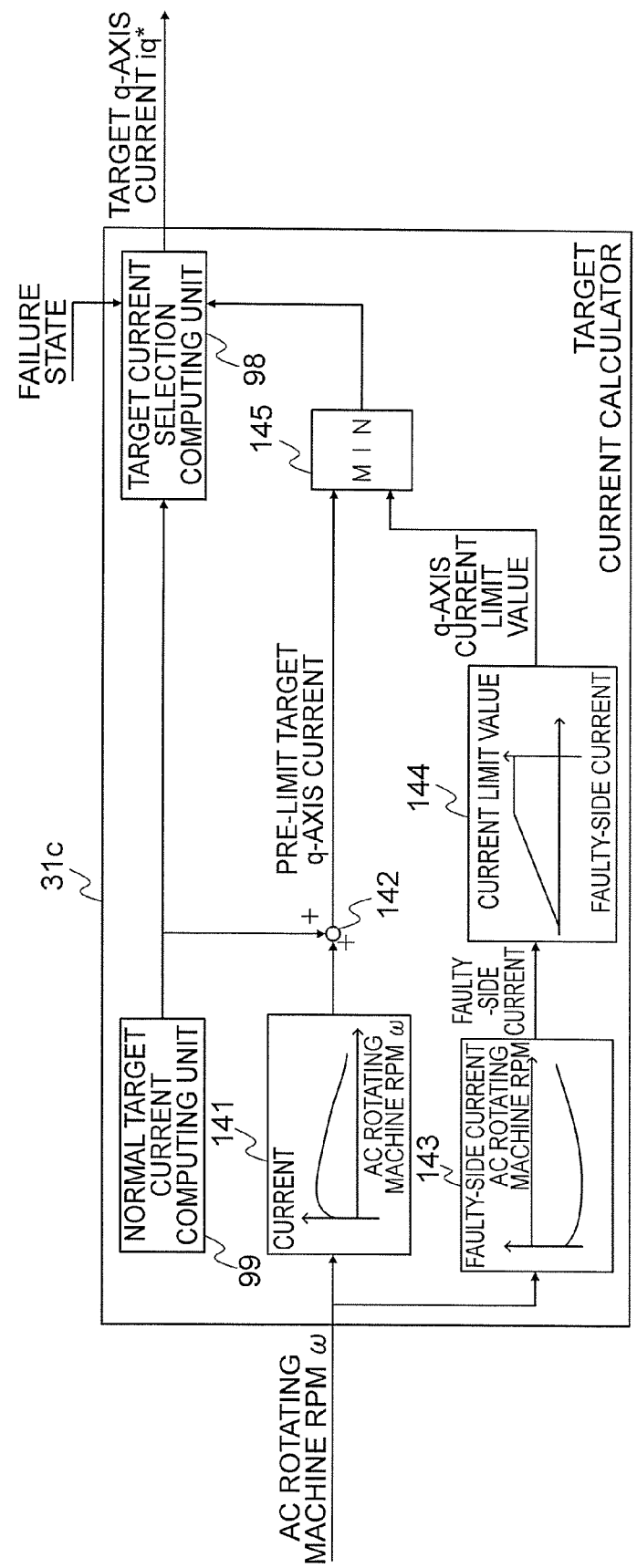
FIG. 16 is a diagram illustrating an example of an internal configuration of the target current calculator illustrated in FIG. 9 according to an eighth embodiment of the present invention.

FIG. 16 illustrates an example of an internal configuration of a target current calculator 31c according to the eighth embodiment. In the target current calculator 31c, the normal target current computing unit 99 outputs a target q-axis current in the normal state. A corrected target q-axis current is calculated by using a conversion table 141 from the AC rotating machine rpm signal ω calculated by the AC rotating machine rpm detection portion 27. As the conversion table 141, for example, a characteristic indicated by the broken line (with larger dashes) of FIG. 11 may be given. Then, the corrected target q-axis current is added to the target q-axis current in the normal state by an adder 142 to calculate a pre-limit target q-axis current.

On the other hand, the q-axis current limit value is calculated as follows. The faulty-side current changes in accordance with the AC rotating machine rpm ω as shown in FIG. 11. Therefore, the faulty-side current is calculated from the AC rotating machine rpm signal ω based on a conversion table 143. Based on a conversion table 144, the q-axis current limit value is calculated from the faulty-side current obtained based on the conversion table 143. Then, a target q-axis current in case of a failure is calculated by a minimum-value selecting unit (MIN) 145 from the pre-limit target q-axis current calculated by the adder 142 and the q-axis current limit value calculated by the conversion table 144.

The target current selection computing unit 98 outputs the target q-axis current in case of a failure or the target q-axis current in the normal state in accordance with the failure state. In the eighth embodiment, the failure occurs in the first winding drive system. Therefore, the target current selection computing unit 98 selects the target q-axis current in case of a failure as the target q-axis current for the first inverter 21. The second winding drive system is normal. Therefore, the target current selection computing unit 98 selects the target q-axis current in the normal state as the target q-axis current for the second inverter 22.

In the current control portion of FIG. 9, a target q-axis current $i_q^*$ calculated by the target current calculator 31*c* and the phase-current detection value I2dtc are given as inputs so that the voltage command computing unit 32 calculates the voltage commands. Based on the calculated voltage commands, the voltage commands TUP2, TUN2, TVP2, TVN2, TWP2, and TWN2 are output by the voltage command output unit 33 to the second switching element drive circuit 25.

In the manner described above, when the failure detection portion 28 detects the failure, the current of the normal-side inverter except for the faulty-side inverter can be decreased by providing the target current calculator 31*c* having the configuration illustrated in FIG. 16 in accordance with the current of the faulty-side inverter so that the control is performed.

Further, although the faulty-side current is calculated based on the conversion table 143 in the eighth embodiment, the phase-current detection value I1dtc may be subjected to dq conversion to calculate the faulty-side current.

Further, although the q-axis current limit value is calculated based on the conversion table 144 in accordance with the magnitude of the current of the faulty-side inverter in the eighth embodiment, a conversion table of a change amount of the current of the faulty-side inverter, an amplitude of the current of the faulty-side inverter, a minimum current value of the faulty-side inverter within a predetermined period of time, or the like may be used for the calculation.

Moreover, although the target q-axis current or the q-axis current limit value is calculated by using the conversion tables in the eighth embodiment, the conversion tables are not required to be used as long as a method providing the same effects is used.

Ninth Embodiment

Although the current limit value is calculated from the current of the faulty-side inverter in the eighth embodiment described above, a duration time may also be taken into consideration so that the current limit value is calculated from a current integrated value of the faulty-side inverter within a predetermined period of time.

An overall configuration of a control device for an AC rotating machine according to a ninth embodiment of the present invention is the same as that illustrated in FIG. 1, and a configuration of current control portion is the same as that illustrated in FIG. 9. Now, as in the eighth embodiment, an operation of the ninth embodiment is described taking the case, as an example, where a short-circuit failure occurs on the high-potential side of the phase W1 of the first winding drive system.

As in the first embodiment described above, by setting ON all the switching elements UP1, VP1, and WP1 on the high-potential side, on which the short-circuit failure of the first inverter 21 occurs, and setting OFF all the other switching elements UN1, VN1, and WN1 in accordance with the operation flowchart of the control illustrated in FIG. 3, a fluctuation of the brake torque due to the rotation angle is reduced. The voltage commands TUP1, TUN1, TVP1, TVN1, TWP1, and TWN1 are output by the voltage command output unit 33 of FIG. 9 to the first switching element drive circuit 24.

Figure 17:
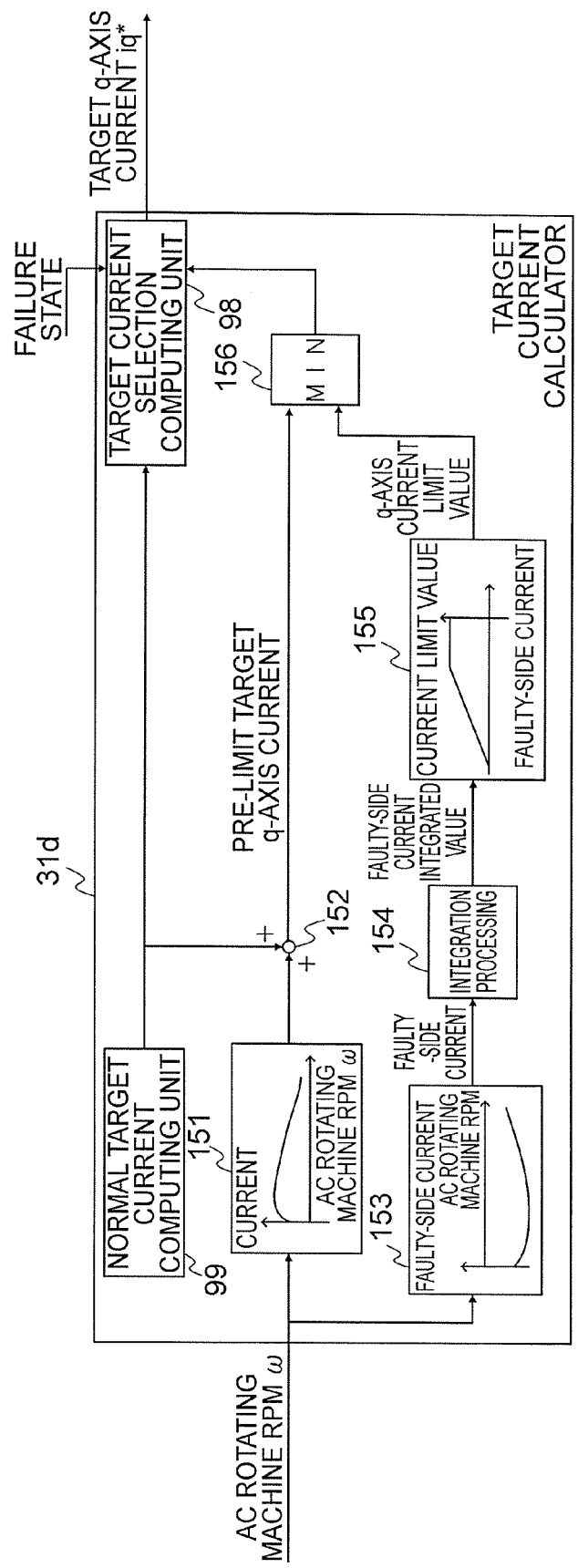
FIG. 17 is a diagram illustrating an example of an internal configuration of the target current calculator illustrated in FIG. 9 according to a ninth embodiment of the present invention.

FIG. 17 illustrates an example of an internal configuration of a target current calculator 31*d* according to the ninth embodiment. In the target current calculator 31*d*, a corrected target q-axis current is calculated by using a conversion table 151 from the AC rotating machine rpm signal ω calculated by the AC rotating machine rpm detection portion 27. As the conversion table 151, for example, a characteristic indicated by the broken line (with larger dashes) of FIG. 11 may be given. The corrected target q-axis current is added to the target q-axis current in the normal state by an adder 152 to calculate a pre-limit target q-axis current.

On the other hand, the q-axis current limit value is calculated as follows. The faulty-side current changes in accordance with the AC rotating machine rpm signal ω as shown in FIG. 11. Therefore, the faulty-side current is calculated from the AC rotating machine rpm ω based on a conversion table 153. Then, a faulty-side current integrated value as the AC rotating machine rpm integrated value within a predetermined period of time is calculated by an integration processing unit 154. For example, a transfer function of the integration processing unit 154 is given by:

$$\sum_{i=0}^{n-1} z^{-n} \qquad [\text{Math. 2}]$$

In the function, $Z^{-1}$ indicates a previous value, and n indicates the number of times of integration of the AC rotating machine rpm signal ω. The integration time is defined by n.

The q-axis current limit value is calculated based on a conversion table 155 from the faulty-side current integrated value obtained by the integration processing unit 154. Then, a target q-axis current in case of a failure is calculated by a minimum-value selecting unit (MIN) 156 from a pre-limit target q-axis current calculated by the adder 152 and the q-axis current limit value calculated by the conversion table 155.

The target current selection computing unit 98 outputs the target q-axis current in case of a failure or the target q-axis current in the normal state in accordance with the failure state. In the ninth embodiment, the failure occurs in the first winding drive system. Therefore, the target current selection computing unit 98 selects the target q-axis current in case of a failure as the target q-axis current for the first inverter 21. The second winding drive system is normal. Therefore, the target current selection computing unit 98 selects the target q-axis current in the normal state as the target q-axis current for the second inverter 22.

In the current control portion 23*a* of FIG. 9, a target q-axis current $i_q^*$ calculated by the target current calculator 31*d* and the phase-current detection value I2dtc are given as inputs so that the voltage command computing unit 32 calculates the voltage commands. Based on the calculated voltage commands, the voltage commands TUP2, TUN2, TVP2, TVN2, TWP2, and TWN2 are output by the voltage command output unit 33 to the second switching element drive circuit 25.

In the manner described above, when the failure detection portion 28 detects the failure, the current of the normal-side inverter except for the faulty-side inverter can be decreased by providing the target current calculator 31*d* having the configuration illustrated in FIG. 17 in accordance with a time period in which the current is generated in the faulty-side inverter so that the control is performed.

Further, although the faulty-side current is calculated based on the conversion table 153 in the ninth embodiment, the phase-current detection value I1dtc may be subjected to dq conversion to calculate the faulty-side current.

Moreover, although the target q-axis current or the q-axis current limit value is calculated by using the conversion tables in the ninth embodiment, the conversion tables are not required to be used as long as a method providing the same effects is used.

Tenth Embodiment

Although the control device for an AC rotating machine has been described above in each of the embodiments, a control device for electrical power steering may be configured so that a torque for assisting a steering torque is generated by the control device for an AC rotating machine.

Figure 18:
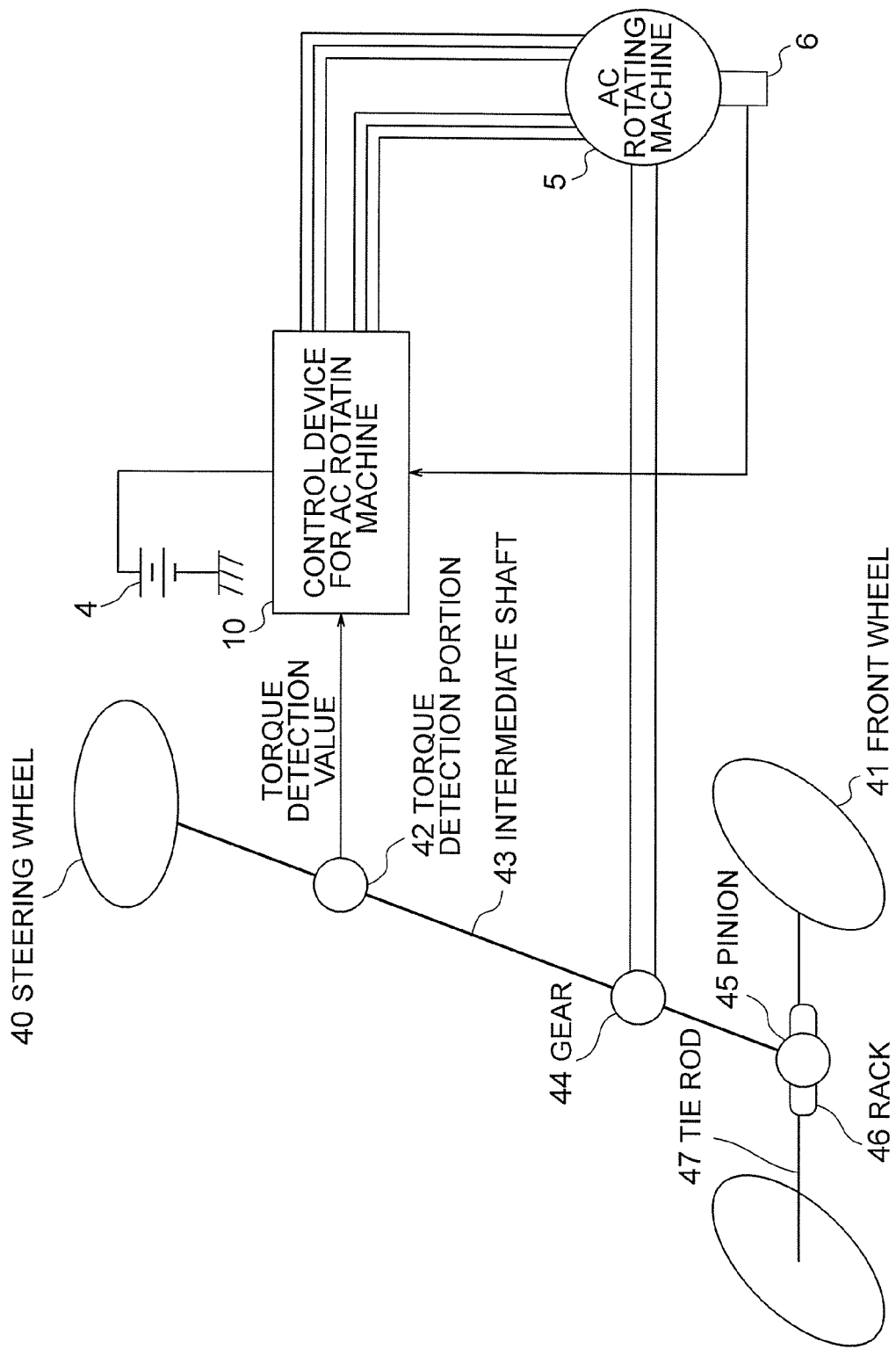
FIG. 18 is a schematic diagram illustrating an overall configuration of an electrical power steering device according to a tenth embodiment of the present invention.

An example of an overall configuration of an electrical power steering device according to a tenth embodiment of the present invention is illustrated in FIG. 18. FIG. 18 illustrates an example of a column-type electrical power steering device. A driver turns a steering wheel 40 to the right and left to steer front wheels 41. Torque detection portion 42 detects a steering torque of a steering system to output a torque detection value to the control device 10 for an AC rotating machine. The output to the AC rotating machine 5 is determined by the current control portion 23 (see FIGS. 1, 9 and the like) of the control device 10 for an AC rotating machine so that the AC rotating machine 5 generates the torque for assisting the steering torque of the steering system. A torque generated by the AC rotating machine 5 is transferred through an intermediation of a gear 44 to an intermediate shaft 43 to be added to the steering torque input by steering the steering wheel 40 by the driver. The total torque is transferred through an intermediation of a pinion gear 45 to a rack 46 and is further transferred to the front wheels 41 through an intermediation of a tie rod 47 connected to the rack 46.

In order to steer the front wheels 41, a force equal to a friction force generated between a road surface and a tire, which is generated under a load distributed to the front wheels, is required. For example, for a vehicle having a total vehicle weight of 1,200 [kg] and a load distribution ratio for front wheels and rear wheels of 6:4, the case where a road-surface friction coefficient is 0.7, a diameter of the steering wheel 40 is 360 [mm], and a pitch circle radius of the pinion gear 45 is 6 [mm] is considered. When the force transferred to the tie rod 47 is converted into a force for steering the front wheels 41, a torque about an axis of a kingpin is required to be considered. In this case, however, it is assumed that the conversion is performed at a ratio of 1:1 for simplification. The force required to steer the front wheels 41 is: 1,200 [kg]×0.6× 9.8 [m/s/s]×0.7=4,939.2 [N]. A torque required for the pinion gear 45 is: 4,939.2 [N]×6 [mm]=29.6 [Nm]. Therefore, when no assist is provided by the electrical power steering, the force required for the driver to steer the steering wheel 40 is: 29.6 [Nm]/360 [mm]×2/9.8=16.8 [kg].

When the output torque of the AC rotating machine 5 is set to 2 [Nm] and a transfer ratio of the gear 44 is set to 10, the force required for the driver to steer the steering wheel 40 is: (29.6 [Nm]−2 [Nm]×10)/360 [mm]×2/9.8=5.4 [kg]. Therefore, in this case, the torque required for the driver to steer the steering wheel 40 becomes about ⅓ by the assist of the electrical power steering. Therefore, for a vehicle which can be steered by various drivers including men and women of all the ages, the assist for the steering torque by the electrical power steering is effective. On the other hand, when the assist for the steering torque is completely stopped during the driving of the vehicle, some drivers cannot perform steering at will. Therefore, it is extremely dangerous.

Now, an operation of this embodiment is described taking the case, as an example, where a short-circuit failure occurs on the high-potential side of the phase W1 of the first winding drive system when the target current calculator 31 illustrated in FIG. 9 is the target current calculator 31 illustrated in FIG. 10 as in the case of the fifth embodiment.

As in the first embodiment described above, by setting ON all the switching elements UP1, VP1, and WP1 on the high-potential side, on which the short-circuit failure of the first inverter 21 occurs, and setting OFF all the other switching elements UN1, VN1, and WN1 in accordance with the operation flowchart of the control illustrated in FIG. 3, a fluctuation of the brake torque due to the rotation angle is reduced. The voltage commands TUP1, TUN1, TVP1, TVN1, TWP1, and TWN1 are output by the voltage command output unit 33 to the first switching element drive circuit 24.

The corrected target q-axis current is calculated from the AC rotating machine rpm signal ω calculated by the AC rotating machine rpm detection portion 27 based on the conversion table 101. As an example of the conversion table 101, the characteristic as indicated by the broken line (with larger dashes) of FIG. 11 is considered.

A target q-axis current $i_q^*$ calculated by the target current calculator 31 and the phase-current detection value I2dtc are given as inputs so that the voltage command computing unit 32 calculates the voltage commands. Based on the calculated voltage commands, the voltage commands TUP2, TUN2, TVP2, TVN2, TWP2, and TWN2 are output by the voltage command output unit 33 to the second switching element drive circuit 25.

In the manner described above, when the failure detection portion 28 detects the failure, the current of the normal-side inverter except for the faulty-side inverter can be corrected by providing the current control portion 23a having the configuration illustrated in FIG. 9 in accordance with the AC rotating machine rpm signal ω obtained by the AC rotating machine rpm detection portion 27 so that the control is performed.

By providing the plurality of inverters, even when a failure occurs in one of the inverters, the steering assist torque can be generated by the other normal inverter. Therefore, a dangerous state with the complete absence of the steering assist torque can be avoided.

Although the tenth embodiment has been described by using the target current detector illustrated in FIG. 10 used in the fifth embodiment, the same effects are obtained even by using the target current detector 31a, 31b, 31c, or 31d used in the other embodiments.

Although the column-type electrical power steering has been described in the tenth embodiment, the same effects are obtained by using rack-type or pinion-type electric power steering.

The present invention is not limited to each of the embodiments described above. It is apparent that the prevent invention encompasses all the possible combinations of the embodiments.

INDUSTRIAL APPLICABILITY

The control device for an AC rotating machine (AC rotary electrical machine), the method therefor, and the electrical power steering device of the present invention are applicable to AC rotating machines in various fields and electrical power steering devices for various vehicles, and provide the same effects.

REFERENCE SIGNS LIST 4 power supply, 5 AC rotating machine, 6 AC rotating machine rotation angle sensor, 10 control device for AC rotating machine, 15 first winding set, 16 second winding set, 21 first inverter, 22 second inverter, 23, 23a current control portion, 24 first switching element drive circuit, 25 second switching element drive circuit, 26 AC rotating machine rotation angle detection portion, 27 AC rotating machine rpm detection portion, 28 failure detection portion, 31 to 31d target current calculator, 32 voltage command computing unit, 33 voltage command output unit, 40 steering wheel, 41 front wheel, 42 torque detection portion, 43 intermediate shaft, 44 gear, 45 pinion gear, 46 rack, 47 tie rod, 98 target current selection computing unit, 99 normal target current computing unit, 101, 111, 113, 121, 124, 131, 133, 141, 143, 144, 151, 153, 155 conversion table (conversion unit), 102, 112, 122, 142, 152 adder, 123, 132, 154 integration processing unit, CT11 to CT32 current detection circuit, UP1, UN1, VP1, VN1, WP1, WN1, UP2, UN2, VP2, VN2, WP2, WN2 switching element.

The invention claimed is:

1. A control device for an AC rotating machine including a plurality of sets of windings, the control device comprising:
a plurality of inverters each including, in respective phases, switching elements configured to control voltages to be applied to respective phases of the plurality of sets of windings;
a current control portion configured to issue voltage commands corresponding to the voltages, to the respective plurality of inverters, to control currents flowing through the plurality of sets of windings; and
a failure detection portion configured to detect at least one of a short-circuit failure and an open-circuit failure in a faulty phase of at least one of the switching elements of a faulty-side inverter, of the plurality of inverters,
wherein the current control portion is configured to set the same potential side of the respective phases of the faulty-side inverter, as that of the faulty phase, to an ON state or an OFF state, in response to detecting the short-circuit failure or the open-circuit failure, respectively, and to continue issuing the voltage commands to a normal-side inverter of the plurality of inverters, in which the short-circuit failure or the open-circuit failure was not detected, to continue a control of the normal-side inverter.

2. The control device for an AC rotating machine according to claim 1, wherein, when the failure detection portion detects the short-circuit failure, the current control portion sets a potential side, which is opposite to that of the faulty phase, to the OFF state, for the respective phases of the faulty-side inverter, and continues the control of the normal-side inverter.

3. The control device for an AC rotating machine according to claim 2, wherein, when the failure detection portion detects the open-circuit failure, the current control portion further sets a potential side, which is opposite to that of the faulty phase, to the ON state, for the respective phases of the faulty-side inverter, and continues the control of the normal-side inverter.

4. The control device for an AC rotating machine according to claim 2, further comprising an rpm detection portion configured to detect an rpm of the AC rotating machine,
wherein, when the failure detection portion detects the at least one of the short-circuit failure or the open-circuit failure, the current control portion corrects a current of the normal-side inverter in accordance with the detected rpm of the AC rotating machine.

5. The control device for an AC rotating machine according to claim 3, further comprising an rpm detection portion configured to detect an rpm of the AC rotating machine,
wherein, when the failure detection portion detects the at least one of the short-circuit failure or the open-circuit failure, the current control portion corrects a current of the normal-side inverter in accordance with the detected rpm of the AC rotating machine.

6. The control device for an AC rotating machine according to claim 4, wherein the current control portion decreases the current of the normal-side inverter in accordance with a magnitude of the rpm of the AC rotating machine.

7. The control device for an AC rotating machine according to claim 5, wherein the current control portion decreases the current of the normal-side inverter in accordance with a magnitude of the rpm of the AC rotating machine.

8. The control device for an AC rotating machine according to claim 1, wherein, when the failure detection portion detects the open-circuit failure, the current control portion further sets a potential side, which is opposite to that of the faulty phase, to the ON state, for the respective phases of the faulty-side inverter, and continues the control of the normal-side inverter.

9. The control device for an AC rotating machine according to claim 8, further comprising an rpm detection portion configured to detect an rpm of the AC rotating machine,
wherein, when the failure detection portion detects the at least one of the short-circuit failure or the open-circuit failure, the current control portion corrects a current of the normal-side inverter in accordance with the detected rpm of the AC rotating machine.

10. The control device for an AC rotating machine according to claim 9, wherein the current control portion decreases the current of the normal-side inverter in accordance with a magnitude of the rpm of the AC rotating machine.

11. The control device for an AC rotating machine according to claim 1, further comprising an rpm detection portion configured to detect an rpm of the AC rotating machine,
wherein, when the failure detection portion detects the at least one of the short-circuit failure or the open-circuit failure, the current control portion corrects a current of the normal-side inverter in accordance with the detected rpm of the AC rotating machine.

12. The control device for an AC rotating machine according to claim 11, wherein the current control portion decreases the current of the normal-side inverter in accordance with a magnitude of the rpm of the AC rotating machine.

13. The control device for an AC rotating machine according to claim 11, wherein the current control portion decreases the current of the normal-side inverter in accordance with a time period in which the rpm of the AC rotating machine is generated.

14. The control device for an AC rotating machine according to claim 12, wherein the current control portion decreases the current of the normal-side inverter in accordance with a time period in which the rpm of the AC rotating machine is generated.

15. The control device for an AC rotating machine according to claim 1, wherein the current control portion detects a current of the plurality of inverters, and decreases the current of the normal-side inverter in accordance with the current of the faulty-side inverter.

16. The control device for an AC rotating machine according to claim 11, wherein the current control portion decreases the current of the normal-side inverter in accordance with a time period in which the current is generated in the faulty-side inverter.

17. The control device for an AC rotating machine according to claim 1, wherein the current control portion detects a current of the plurality of inverters, and decreases the current of the normal-side inverter in accordance with a magnitude of the current of the faulty-side inverter.

18. The control device for an AC rotating machine according to claim 17, wherein the current control portion decreases the current of the normal-side inverter in accordance with a time period in which the current is generated in the faulty-side inverter.

19. An electrical power steering device, comprising the AC rotating machine to be controlled by the control device according to claim 1,
wherein the AC rotating machine generates a steering assist torque.

20. A control method for an AC rotating machine, the method comprising: controlling voltages to be applied to respective phases of a plurality of sets of windings, via respective inverters;
controlling currents flowing through the plurality of sets of windings based on the voltages applied to switching elements of the respective inverters,
detecting at least one of a short-circuit failure and an open-circuit failure in a faulty phase of at least one of the switching elements of a faulty-side inverter, of the respective inverters;
setting, the same potential side of the respective phases of the faulty-side inverter, as that of the faulty phase, to an ON state or an OFF state, in response to detecting the short-circuit failure or the open-circuit failure, respectively; and
issuing voltage commands to a normal-side inverter of the respective inverters, in which the short-circuit failure or the open-circuit failure was not detected, to continue a control of the normal-side inverter.

21. The control method according to claim 20, wherein the setting comprises:
setting a potential side, which is opposite to that of the faulty phase, to the OFF state for the respective phases of the faulty-side inverter, in response to detecting the short-circuit failure.

22. The control method according to claim 20, wherein the setting comprises:
setting a potential side, which is opposite to that of the faulty phase, to the ON state for the respective phases of the faulty-side inverter, in response to detecting the open-circuit failure.

* * * * *